(12) United States Patent
Watanabe

(10) Patent No.: US 7,924,448 B2
(45) Date of Patent: Apr. 12, 2011

(54) DATA COMMUNICATION APPARATUS WITH TEST COMMUNICATION, CENTRAL MANAGING APPARATUS, TESTING METHOD, REMOTE MANAGING SYSTEM AND COMPUTER-READABLE STORAGE MEDIUM

(75) Inventor: Hidehiko Watanabe, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1817 days.

(21) Appl. No.: 10/370,572

(22) Filed: Feb. 24, 2003

(65) Prior Publication Data

US 2003/0210425 A1 Nov. 13, 2003

(30) Foreign Application Priority Data

Feb. 26, 2002 (JP) .................. 2002-049915
Feb. 10, 2003 (JP) .................. 2003-032693

(51) Int. Cl.
*G06F 3/12* (2006.01)
*G06F 1/24* (2006.01)
*G06F 9/00* (2006.01)
(52) U.S. Cl. ..................... 358/1.15; 713/100
(58) Field of Classification Search .......... 358/1.18, 358/1.15, 434, 442, 400; 709/249
See application file for complete search history.

(56) References Cited

U.S. PATENT DOCUMENTS

| | | | | |
|---|---|---|---|---|
| 5,270,775 A | * | 12/1993 | Suzuki | 399/8 |
| 5,692,036 A | * | 11/1997 | Saito | 379/216.01 |
| 5,727,248 A | * | 3/1998 | Ogura | 399/8 |
| 5,893,005 A | * | 4/1999 | Ogura | 399/11 |
| 6,707,580 B1 | * | 3/2004 | Bloomfield | 358/402 |
| 6,714,315 B1 | * | 3/2004 | Yoshida | 358/1.18 |
| 6,714,988 B2 | * | 3/2004 | Takemoto et al. | 709/249 |
| 2002/0010854 A1 | * | 1/2002 | Ogura et al. | 713/100 |
| 2002/0080390 A1 | * | 6/2002 | Ogura | 358/1.15 |
| 2002/0191215 A1 | | 12/2002 | Watanabe | |

FOREIGN PATENT DOCUMENTS

| | | |
|---|---|---|
| JP | 03-195247 | 8/1991 |
| JP | 7-46357 | 2/1995 |
| JP | 7-58867 | 3/1995 |
| JP | 09-149139 | 6/1997 |
| JP | 11-298620 | 10/1999 |
| JP | 2000-322301 | 11/2000 |
| JP | 2003-051796 | 2/2003 |

* cited by examiner

*Primary Examiner* — Edward L Coles
*Assistant Examiner* — Vincent Rudolph
(74) *Attorney, Agent, or Firm* — Dickstein Shapiro LLP

(57) ABSTRACT

A data communication apparatus is provided with a connecting section connectable to at least one managed apparatus, a sending section calling via a communication line a central management apparatus which remotely manages the managed apparatus and sending status information of the managed apparatus to the central managing apparatus, a set section set with parameters from the central managing apparatus, where the parameters include a called telephone number which called by the status information sending section and/or line type information which indicates a type of line, and a communication section responding to a request from the central managing apparatus and calling the called telephone number to make a test communication.

19 Claims, 17 Drawing Sheets

FIG.5

| No. | PARAMETER NAME |
|---|---|
| 1 | SC/MC TEL. NO. |
| 2 | SC/MC RE-DIALING WAIT TIME |
| 3 | SC/MC NO. OF RE-DIALINGS MADE |
| 4 | ALARM CALL TEL. NO. |
| 5 | ALARM CALL RE-DIALING WAIT TIME |
| 6 | ALARM CALL NO. OF RE-DIALINGS MADE |
| 7 | COUNTER CALL TEL. NO. |
| 8 | COUNTER CALL RE-DIALING WAIT TIME |
| 9 | COUNTER CALL NO. OF RE-DIALINGS MADE |
| 10 | PPC MODEL NO. OF DEVICE ADDRESS D0 |
| 11 | PPC MODEL NO. OF DEVICE ADDRESS D1 |
| 12 | PPC MODEL NO. OF DEVICE ADDRESS D2 |
| 13 | PPC MODEL NO. OF DEVICE ADDRESS D3 |
| 14 | PPC MODEL NO. OF DEVICE ADDRESS D4 |
| 15 | COUNTER TOTALING DAY FOR DEVICE ADDRESS D0 |
| 16 | COUNTER TOTALING DAY FOR DEVICE ADDRESS D1 |
| 17 | COUNTER TOTALING DAY FOR DEVICE ADDRESS D2 |
| 18 | COUNTER TOTALING DAY FOR DEVICE ADDRESS D3 |
| 19 | COUNTER TOTALING DAY FOR DEVICE ADDRESS D4 |
| 20 | ALARM CALL NOTIFYNG TIME |
| 21 | COUNTER CALL NOTIFYING TIME |
| 22 | LINE TYPE INFO (PB LINE/DP LINE) |
| 23 | PARAMETER LOG INFO IDENTIFIER |

FIG.12

| PARAMETER LOG INFO IDENTIFIER | PARAMETER CONTENTS | | | | |
|---|---|---|---|---|---|
| 08161125 | (LINE TYPE IS DP WITHOUT-0 BEFORE TEL. NO.) | | | | |
| 08161128 | (LINE TYPE IS DP WITH-0 BEFORE TEL. NO.) | | | | |
| 08161152 | (LINE TYPE IS PB WITHOUT-0 BEFORE TEL. NO.) | | | | |

FIG.14A

| ID CODE | ; | IDENTIFICATION CODE | ; | REQUEST INFO CODE | | |
|---|---|---|---|---|---|---|
| | | | | INFO CODE | DIGIT | CALL TYPE |
| | | | | 12330001211 | 01 | (1) |

CALL TYPE
1: SC CALL
2: ALARM CALL
3: COUNTER CALL

FIG.14B

| ID CODE | ; | IDENTIFICATION CODE | ; | REQUEST INFO CODE | | | | |
|---|---|---|---|---|---|---|---|---|
| | | | | INFO CODE | DIGIT | CALL TYPE | LINE TYPE | PARAMETER SETTING DATE-AND-HOUR |
| | | | | 12330001211 | 10 | (1) | (1) | MMDDHHmm |

LINE TYPE
1: PB LINE
2: DP LINE (10pps)
3: DP LINE (20pps)

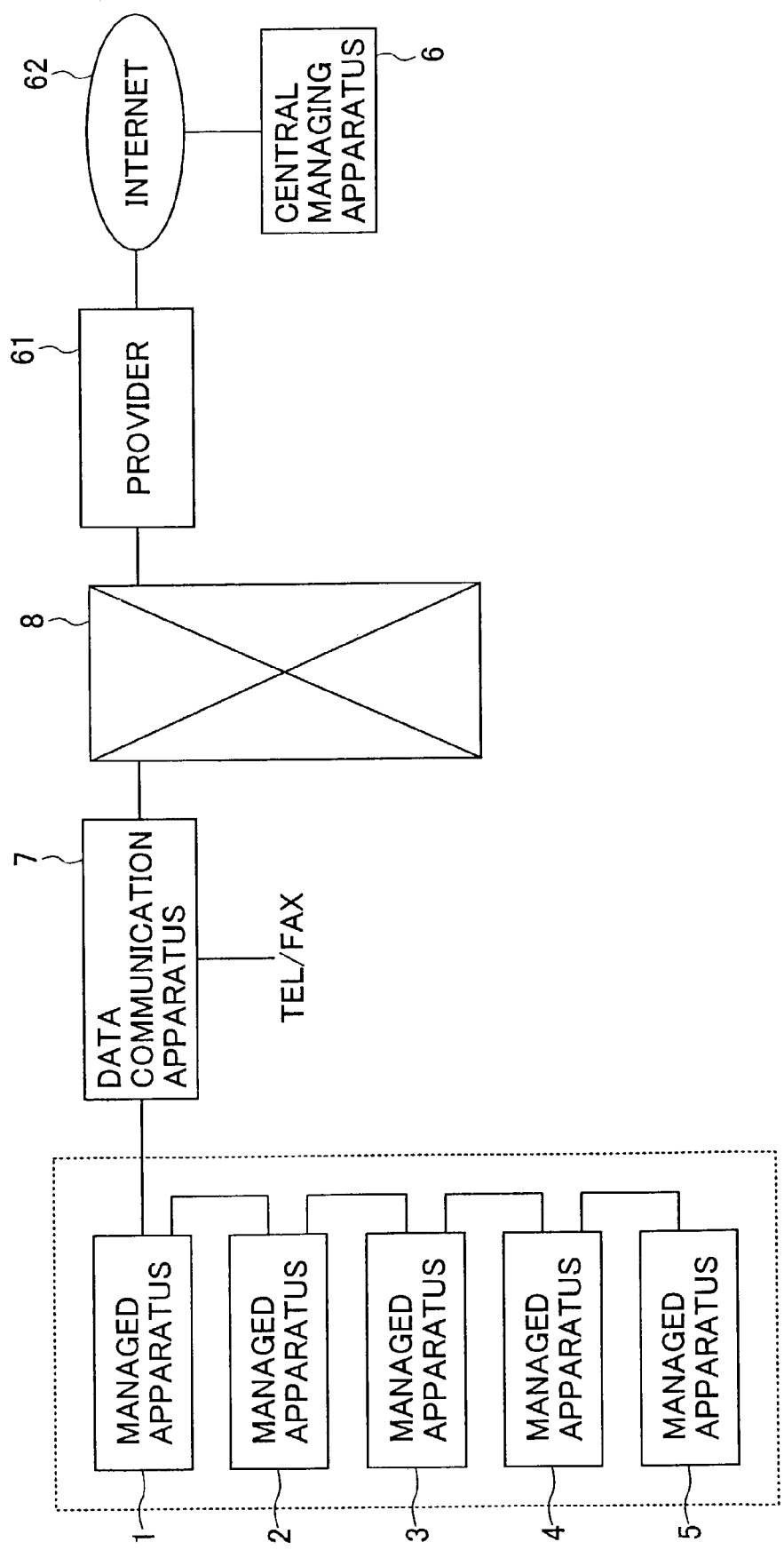

DATA COMMUNICATION APPARATUS WITH TEST COMMUNICATION, CENTRAL MANAGING APPARATUS, TESTING METHOD, REMOTE MANAGING SYSTEM AND COMPUTER-READABLE STORAGE MEDIUM

BACKGROUND OF THE INVENTION

This application claims the benefit of Japanese Patent Applications No.2002-049915 filed Feb. 26, 2002 and No.2003-032693 filed Feb. 10, 2003, in the Japanese Patent Office, the disclosures of which are hereby incorporated by reference.

1. Field of the Invention

The present invention generally relates to data communication apparatuses, central managing apparatuses, testing methods, remote managing systems and computer-readable storage media, and more particularly to a data communication apparatus, a central managing apparatus, a testing method, a remote managing system and a computer-readable storage medium, which manage managed apparatuses such as an electronic apparatus.

The managed apparatuses to which the present invention is applied, include electronic apparatuses which have a communicating function and are connectable to a network or a communication line, such image processing apparatuses, electrical home appliances, automatic vending machines, medical equipments, power supply apparatuses, air conditioning systems, measuring systems, and computers. The image processing apparatuses include printers, facsimile machines, copying machines, scanners, and digital composite machines having composite functions. In addition, the measuring systems include systems for measuring supply of gas, electricity, water and the like.

2. Description of the Related Art

A generally known remote managing system for image forming apparatuses manage a plurality of image forming apparatuses, such as copying machines, which are set up at a plurality of arbitrary users on a precondition that the image forming apparatuses will be remotely diagnosed. The image forming apparatuses are connectable to a central managing apparatus which is set up at a service center, via a data communication apparatus and a communication line such as a public line. The central managing apparatus remotely manages the image forming apparatuses via the communication line and the data communication apparatus. Such a remote managing system is proposed in a Japanese Laid-Open Patent Applications No.7-46357 and No.7-58867, for example. The "user" refers to a customer, and the "service center" refers to a point of sales or service.

In the remote managing system described above, the image forming apparatus is provided with a counter which counts a number of images formed depending on an image forming operation, and stores counter information indicative of a counted value of the counter. The data communication apparatus is provided with a connecting means for connecting the image forming apparatuses to the data communication apparatus. The connecting means periodically (for example, once a day at a predetermined time) acquires status information such as the counter information of the counter from the image forming apparatus connected thereto. In addition, the data communication apparatus periodically (for example, once a month on a predetermined accounting day at a predetermined time) calls the central managing apparatus via the communication line, and sends the status information acquired from the image forming apparatuses to the central managing apparatus.

Parameters, including a called-end telephone number which is used when the data communication apparatus calls the central managing apparatus, are set in the data communication apparatus from the central managing apparatus. In other words, the central managing apparatus downloads to the data communication apparatus the parameters including the called-end telephone number (telephone number used when the data communication apparatus calls the central managing apparatus) which is the telephone number of the central managing apparatus itself.

In the conventional remote managing system, when the central managing apparatus sends and sets (including resetting) the above described parameters to the data communication apparatus, it is necessary to add an external line selection signal (for example, call by dialing "0" first) to the called-end telephone number in the parameters which are to be sent, in cases such as when adding to the parameters line type information which indicates a type (bush-button line or dial-pulse line) of the line (line used when calling the central managing apparatus) to which the data communication apparatus is connected, and when the data communication apparatus is connected to a private branch exchange (PBX).

In such cases, it is necessary to confirm whether or not the line type information and the called-end telephone number in the parameters which are set in the data communication apparatus respectively match the line type information (indicating the type of line actually connected to the data communication apparatus) and the called-end telephone number (actual telephone number of the central managing apparatus) which are actually required. But in order to make such a confirmation, it is necessary to send a service person to the location (user) where the data communication apparatus is set up. In other words, it is necessary for the service person to call from the data communication apparatus the called-end telephone number in the parameters which are set in the data communication apparatus, and to send manual call information (a portion of status information) to the central managing apparatus which is the called end (destination), so as to confirm whether or not a normal communication is possible.

In addition, a situation may occur where the central managing apparatus can make access to the data communication apparatus but the status information which is to be periodically sent from the data communication apparatus cannot be received by the central managing apparatus. The cause of such a situation may be tat the type of the line connected to the data communication apparatus is changed or, a PBX is employed thereby requiring an external selection signal to be used. However, even if the central managing apparatus sends and resets the parameters to the data communication apparatus, it still requires a service person to be sent to the location where the data communication apparatus is set up, in order to confirm whether or not the data communication apparatus can make a normal call to the central managing apparatus. Similarly to the above described case, it is also necessary in this case for the service person to call from the data communication apparatus the called-end telephone number in the parameters which are set in the data communication apparatus, and to send the manual call information to the central managing apparatus, so as to confirm whether or not a normal communication is possible.

SUMMARY OF THE INVENTION

Accordingly, it is a general object of the present invention to provide a novel and useful data communication apparatus, central managing apparatus, testing method, remote managing system and computer-readable storage medium, in which the problems described above are eliminated.

Another and more specific object of the present invention is to provide a data communication apparatus, a central managing apparatus, a testing method, a remote managing system and a computer-readable storage medium, which can confirm whether or not a normal communication is possible, without having to send a service person to a location where the data communication apparatus is set up in order to make the confirmation, even in a case where the central managing apparatus sends and resets parameters to the data communication apparatus or, in a case where the central managing apparatus can make access to the data communication apparatus but cannot receive status information which is to be sent periodically from the data communication apparatus.

Still another object of the present invention is to provide a data communication apparatus comprising a connecting section connectable to at least one managed apparatus; a status information sending section calling via a communication line a central management apparatus which remotely manages the managed apparatus, and sending status information of the managed apparatus to the central managing apparatus; a parameter set section set with parameters from the central managing apparatus, the parameters including a called telephone number which called by the status information sending section and/or line type information which indicates a type of line; and a test communication section responding to a request from the central managing apparatus and calling the called telephone number to make a test communication. According to the data communication apparatus of the present invention, it is possible to confirm whether or not a normal communication is possible, without having to send a service person to a location where the data communication apparatus is set up in order to make the confirmation, even in a case where the central managing apparatus sends and resets parameters to the data communication apparatus or, in a case where the central managing apparatus can make access to the data communication apparatus but cannot receive status information which is to be sent periodically from the data communication apparatus.

A further object of the present invention is to provide a central managing apparatus which is capable of communicating with a data communication apparatus, and acquires, via the data communication apparatus and a communication line, status information of at least one managed apparatus which is to be remotely managed, comprising a parameter sending section sending to the data communication apparatus parameters which include a called telephone number which is called when the central managing apparatus is called from the data communication apparatus, and/or line type information indicating a type of line; a parameter changing section changing the parameters which are to be sent by the parameter sending section; and an identification information adding section adding, to the parameters which are to be sent by the parameter sending section, identification information which enables discrimination of a log of parameter changes made by the parameter changing section. According to the central managing apparatus of the present invention, it is possible to confirm whether or not-a normal communication is possible, without having to send a service person to a location where the data communication apparatus is set up in order to make the confirmation, even in a case where the central managing apparatus sends and resets parameters to the data communication apparatus or, in a case where the central managing apparatus can make access to the data communication apparatus but cannot receive status information which is to be sent periodically from the data communication apparatus.

Another object of the present invention is to provide a testing method for testing a data communication apparatus which sends to a central managing apparatus via a communication line status information of at least one managed apparatus which is to be remotely managed by the central managing apparatus, comprising making a connection between the data communication apparatus and the central managing apparatus to enable a communication therebetween; disconnecting the connection between the data communication apparatus and the central managing apparatus in response to a test call request from the central managing apparatus; making a test call by calling the central managing apparatus from the data communication apparatus based on line type information and a called telephone number of a counter call within parameters which are stored within the data communication apparatus; and judging whether or not a communication from the data communication apparatus to the central managing apparatus made by a test call is successful. According to the testing method of the present invention, it is possible to confirm whether or not a normal communication is possible, without having to send a service person to a location where the data communication apparatus is set up in order to make the confirmation, even in a case where the central managing apparatus sends and resets parameters to the data communication apparatus or, in a case where the central managing apparatus can make access to the data communication apparatus but cannot receive status information which is to be sent periodically from the data communication apparatus.

Still another object of the present invention is to provide a remote managing system comprising a central managing apparatus, at least one managed apparatus which is to be remotely managed by the central managing apparatus, and a data communication apparatus which sends status information from the managed apparatus to the central managing apparatus via a communication line, wherein the central managing apparatus comprises a parameter sending section which sends and sets parameters to the data communication apparatus, the parameters including a called telephone number which is used when calling the central managing apparatus from the data communication apparatus and/or line type information which indicates a type of line; and the data communication apparatus comprises a test communication section which calls the called telephone number and makes a test communication in response to a request from the central managing apparatus. According to the remote managing system of the present invention, it is possible to confirm whether or not a normal communication is possible, without having to send a service person to a location where the data communication apparatus is set up in order to make the confirmation, even in a case where the central managing apparatus sends and resets parameters to the data communication apparatus or, in a case where the central managing apparatus can make access to the data communication apparatus but cannot receive status information which is to be sent periodically from the data communication apparatus.

A further object of the present invention is to provide a computer-readable storage medium which stores a program which causes a computer which is coupled to at least one managed apparatus to call via a communication line a central managing apparatus which remotely manages the managed apparatus, and to send status information of the managed apparatus to the central managing apparatus, the program comprising a parameter set procedure causing the computer to be set with parameters from the central managing apparatus, the parameters including a called telephone number used by the computer when calling the central managing apparatus and/or line type information which indicates a type of line; and a test communication procedure causing the computer to call the called telephone number and making a test communication in response to a request from the central managing apparatus. According to the computer-readable storage medium of the present invention, it is possible to confirm whether or not a normal communication is possible, without having to send a service person to a location where the computer is set up in order to make the confirmation, even in a case where the central managing apparatus sends and resets parameters to the computer or, in a case where the central managing apparatus can make access to the computer but cannot receive status information which is to be sent periodically from the computer.

Another object of the present invention is to provide a computer-readable storage medium which stores a program for causing a computer to acquire, via a data communication apparatus and a communication line, status information of at least one managed apparatus which is to be remotely managed, the program comprising a parameter sending procedure causing the computer to send to the data communication apparatus parameters which include a called telephone number which is called when the computer is called from the data communication apparatus, and/or line type information indicating a type of line; a parameter changing procedure causing the computer to change the parameters which are to be sent by the parameter sending procedure; and an identification information adding procedure causing the computer to add, to the parameters which are to be sent by the parameter sending procedure, identification information which enables discrimination of a log of parameter changes made by the parameter changing procedure. According to the computer-readable storage medium of the present invention, it is possible to confirm whether or not a normal communication is possible, without having to send a service person to a location where the data communication apparatus is set up in order to make the confirmation, even in a case where the computer sends and resets parameters to the data communication apparatus or, in a case where the computer can make access to the data communication apparatus but cannot receive status information which is to be sent periodically from the data communication apparatus.

Still another object of the present invention is to provide a computer-readable storage medium which stores a program for causing a computer to test the computer which sends to a central managing apparatus via a communication line status information of at least one managed apparatus which is to be remotely managed by the central managing apparatus, the program comprising a procedure which causes the computer to make a connection to the central managing apparatus to enable a communication therewith; a procedure causing the computer to disconnect the connection to the central managing apparatus in response to a test call request from the central managing apparatus; a procedure causing the computer to make a test call by calling the central managing apparatus based on line type information and a called telephone number of a counter call within parameters which are stored within the computer; and a procedure causing the computer to judge whether or not a communication to the central managing apparatus made by a test call is successful. According to the computer-readable storage medium of the present invention, it is possible to confirm whether or not a normal communication is possible, without having to send a service person to a location where the computer is set up in order to make the confirmation, even in a case where the central managing apparatus sends and resets parameters to the computer or, in a case where the central managing apparatus can make access to the computer but cannot receive status information which is to be sent periodically from the computer.

Other objects and further features of the present invention will be apparent from the following detailed description when read in conjunction with the accompanying drawings.

BRIEF DESCRIPTION OF THE DRAWINGS

FIG. 5 is a diagram showing various parameters within a non-volatile RAM;

FIG. 12 is a diagram showing a corresponding relationship of parameter log information identifiers and portions of parameters stored in a database of a hard disk;

FIGS. 14A and 14B respectively are diagrams showing a structure of text data exchanged between the central managing apparatus and the data communication apparatus when the data communication apparatus carries out the test communication control;

FIG. 17 is a system block diagram showing a structure of a second embodiment of the remote managing system according to the present invention.

DESCRIPTION OF THE PREFERRED EMBODIMENTS

Figure 1:
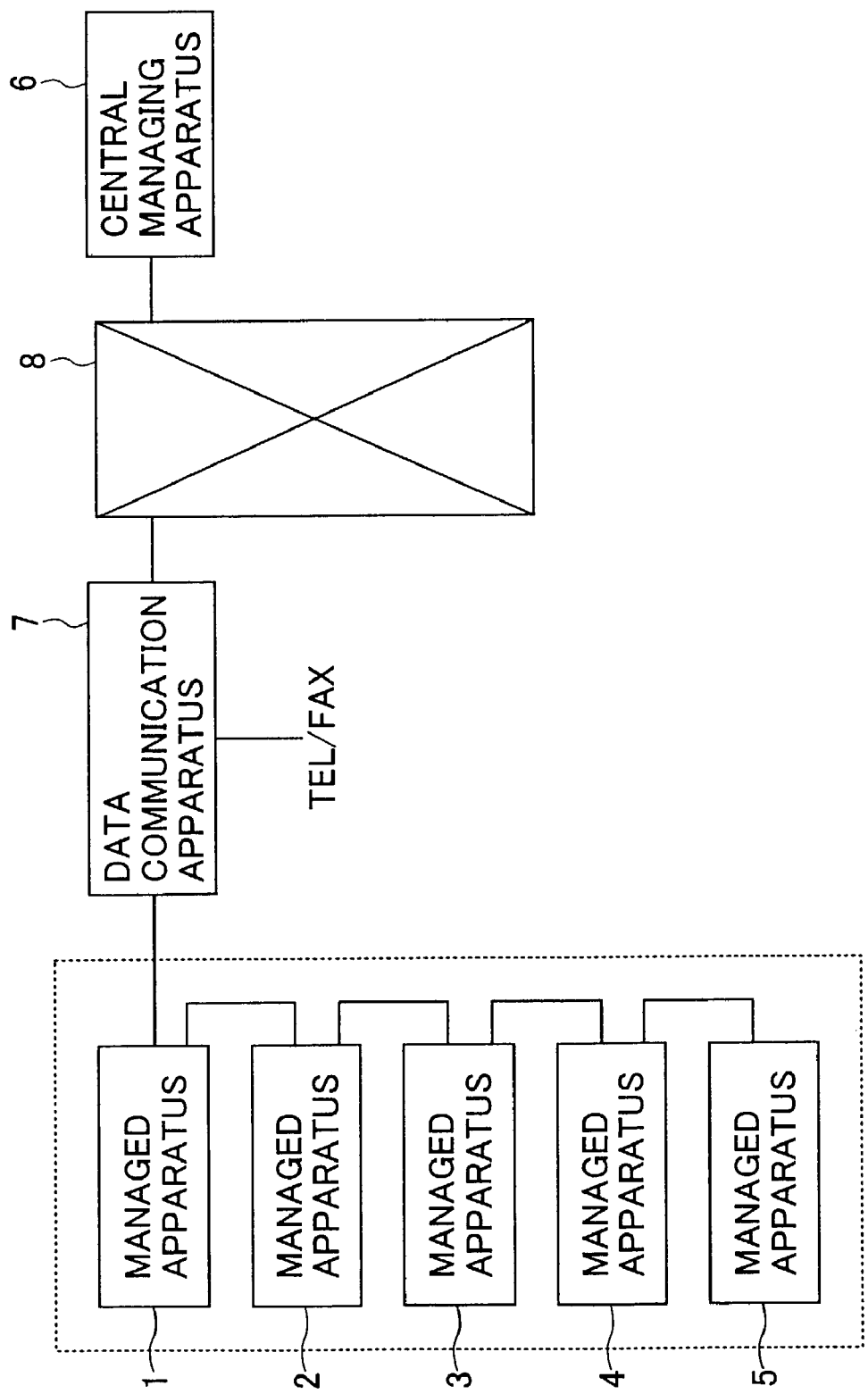
FIG. 1 is a system block diagram showing a structure of a first embodiment of a remote managing system according to the present invention.

A description will be given of various embodiments of a data communication apparatus, a central managing apparatus, a testing method, a remote managing system and a computer-readable storage medium according to the present invention, by referring to the drawings.

FIG. 1 is a system block diagram showing a first embodiment of the remote managing system according to the present invention. This first embodiment of the remote managing system employs a first embodiment of the data communication apparatus according to the present invention, a first embodiment of the central managing apparatus according to the present invention, a first embodiment of the testing method according to the present invention, and a first embodiment of the computer-readable storage medium according to the present invention.

The remote managing system shown in FIG. 1 includes a plurality of managed apparatuses 1 through 5, a data communication apparatus 7, and a central managing apparatus 6. It is a precondition that the managed apparatuses 1 through 5 are to be remotely diagnosed. The central managing apparatus 6 centrally and remotely manages each of the managed apparatuses 1 through 5 via a communication line 8 and the data communication apparatus 7. The communication line 8 is formed by a public line, an exclusive line or the like. In this embodiment, it is assumed for the sake of convenience that a copying machine, which is an example of an image forming apparatus, is used as each of the managed apparatuses 1 through 5.

The data communication apparatus 7 includes a connecting means (or section) for connecting each of the managed apparatuses 1 through 5. The data communication apparatus 7 includes the functions of selectively sending to the managed apparatuses 1 through 5 an instruction signal which is received from the central managing apparatus 6 via the communication line 8, and sending to (notifying) the central managing apparatus 6 via the communication line 8 various notification information (status information) received from the managed apparatuses 1 through 5.

Normally, the power of the data communication apparatus 7 is turned ON 24 hours a day, and the data communication apparatus 7 is capable of communicating with the central managing apparatus 6 even while the power of the managed apparatuses 1 through 5 is turned OFF. A serial communication interface RS-485 connects the data communication apparatus 7 and each of the managed apparatuses 1 through 5 by a multi-drop connection. The data communication apparatus 7 communicates with each of the managed apparatuses 1 through 5 depending on a polling operation and a selecting operation from the data communication apparatus 7.

Figure 2:
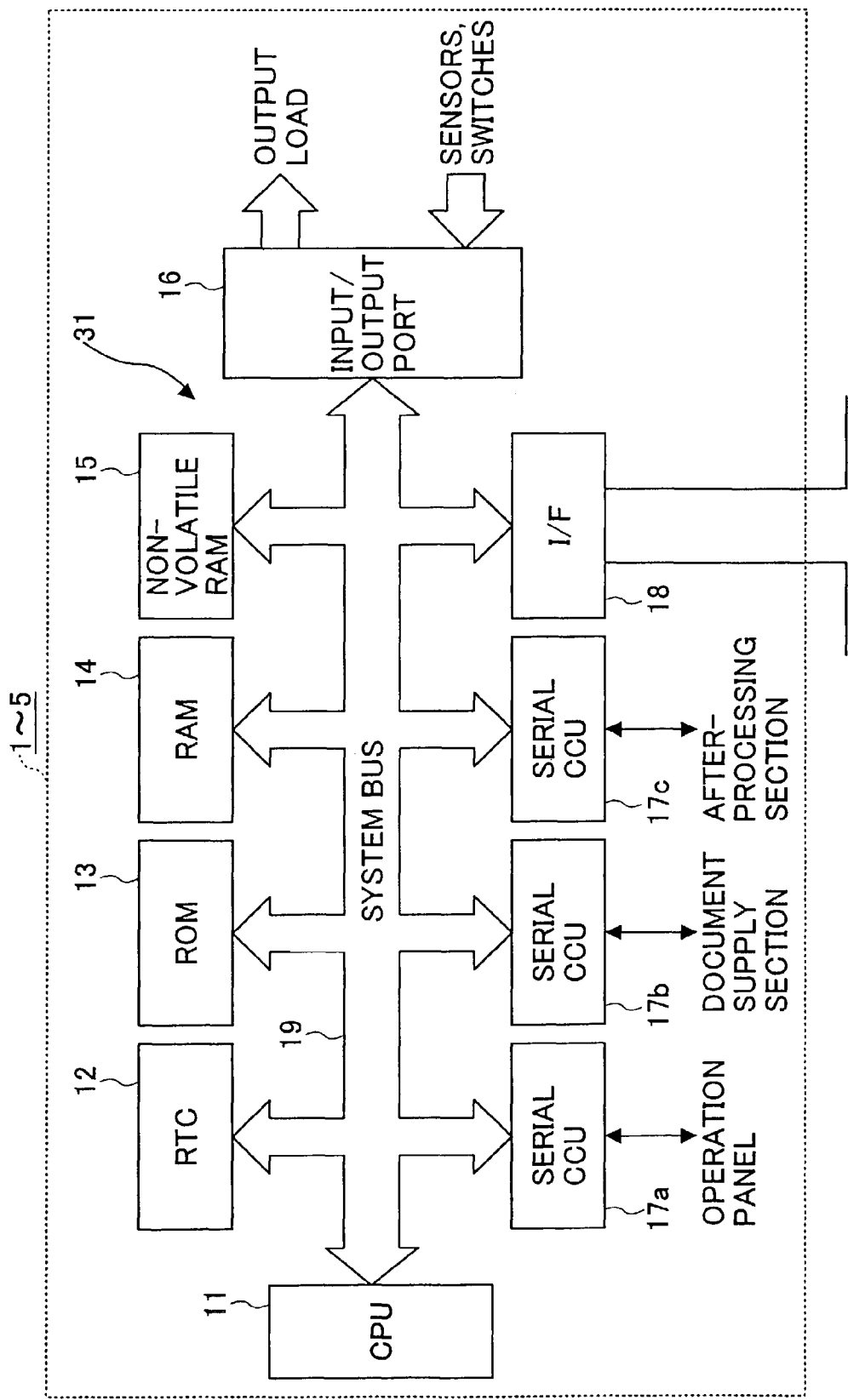
FIG. 2 is a system block diagram showing a structure of a controller within a managed apparatus.

FIG. 2 is a system block diagram showing a structure of a controller within each of the managed apparatuses 1 through 5 shown in FIG. 1.

The controller within each of the managed apparatuses 1 through 5 includes plain paper copying machine (PPC) controller 31, a personal interface (I/F) 18, and a system bus 19. The PPC controller 31 includes a CPU 11, a real time clock (RTC) circuit 12, a ROM 13, a RAM 14, a non-volatile RAM 15, an input and output (input/output) port 16, and serial communication control units (CCUs) 17a, 17b and 17c which are connected as shown in FIG. 2.

The CPU 11 generally controls the entire controller based on computer programs and various data stored in the ROM 13. The RTC circuit 12 forms a date-and-hour information generating means (or section) for generating date-and-hour information which indicates a present date and hour (year, month, date, hour and minutes). The CPU 11 is capable of knowing the present date-and-hour by reading the date-and-hour information generated by the RTC circuit 12.

The RAM 14 forms a temporary memory which is usable as a work memory when the CPU 11 carries out a data processing or the like. The non-volatile RAM 15 stores contents of a mode instruction from an operation panel (not shown) or the like of the managed apparatus to which the controller belongs, and is capable of maintaining the stored contents even when the power of the managed apparatus is turned OFF. For example, the operation panel includes an operation part having operation buttons or the like, and a display part. The non-volatile memory 15 is also used as a counter for counting a number of images formed depending on an image forming operation and storing counter information which indicates a counted value, in response to an instruction from the CPU 11. Of course, it is possible to use other non-volatile memories, such as a flash ROM, in place of the non-volatile RAM 15.

The input/output port 16 connects the controller to parts within the managed apparatus, such as output loads (not shown) and sensors or switches (not shown). The output loads include motors solenoids, clutches and the like. The serial CCU 17a exchanges signals with the operation panel of the managed apparatus. The serial CCU 17b exchanges signals with a document supply section (not shown) within the managed apparatus. The serial CCU 17c exchanges signals with a transfer sheet after-processing section (not shown) within the managed apparatus, which carries out an after-process with respect to a transfer sheet such as paper on which an image is formed.

The personal I/F 18 forms a communication interface between the managed apparatus and the data communication apparatus 7, and is provided to reduce a load on the CPU 11 which processes the communication between the managed apparatus and the data communication apparatus 7. Of course, if the processing capability of the CPU 11 is sufficiently large, the functions of the personal I/F 18 may be included within the CPU 11. The personal I/F 18 is provided with the following main functions (f1) through (f4).

(f1) Monitoring the polling operation and the selecting operation from the data communication apparatus 7.

(f2) Processing an acknowledge response and a non-acknowledge response to the data communication apparatus 7.

(f3) Validity check and parity check of sending and receiving data between the managed apparatus and the data communication apparatus 7, and processing resend request when error is generated.

(f4) Processing header of sending and receiving data between the managed apparatus and the data communication apparatus 7.

The system bus 19 forms a bus line which includes an address bus, a control bus and a data bus. The system bus 19 mutually connects the CPU 11, the RTC circuit 12, the ROM 13, the RAM 14, the non-volatile RAM 15, the input/output port 16, the serial CCUs 17a, 17b and 17c, and the personal I/F 18.

Figure 3:
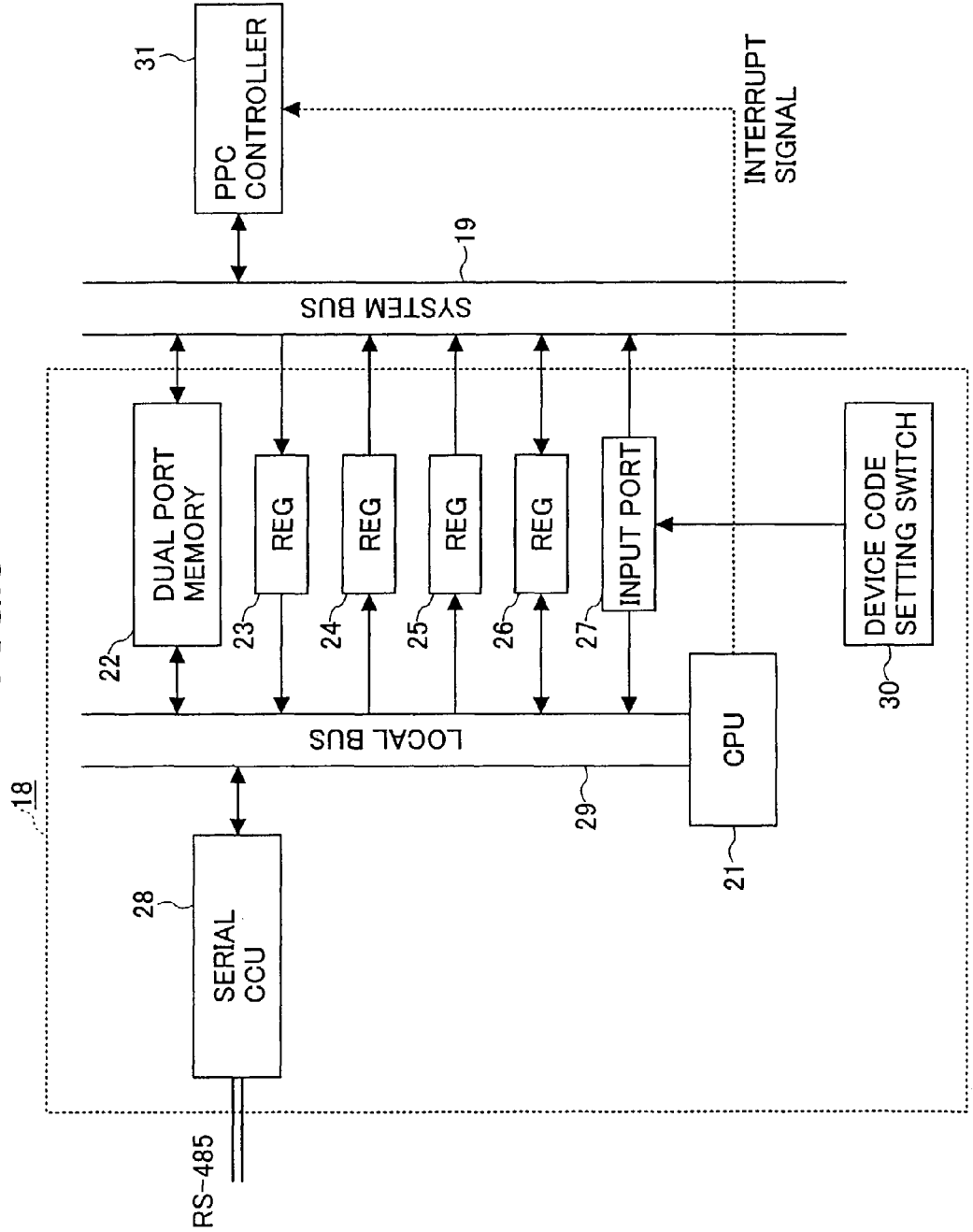
FIG. 3 is a system block diagram showing a structure of a personal interface.

FIG. 3 is a system block diagram showing a structure of the personal I/F 18 shown in FIG. 2.

The personal I/F 18 includes a CPU 21, a dual port memory 22, registers 23 through 26, an input port 27, and serial communication control unit (CCU) 28, a local bus 29, and a device code setting switch 30 which are connected as shown in FIG. 3.

The CPU 21 is formed by a 1-chip microcomputer having a central processor, a ROM, a RAM and the like which are connected by a bus. The CPU 21 generally controls the entire personal I/F 18. The dual port memory 22 can be read from both the CPU 21 and the CPU 11 shown in FIG. 2, and is used to exchange text data between the personal I/F 18 and the PPC controller 31. The register 23 through 26 are used for control when exchanging the text data between the personal I/F 18 and the PPC controller 31, but a detailed description thereof will be omitted in this specification since the operations of the registers 23 through 26 are not directly related to the subject matter of the present invention.

The device code setting switch 30 is provided to set a device code (device address) which is peculiar to each managed apparatus. The device code is used to identify the managed apparatus when the polling operation and the selecting operation are carried out from the data communication apparatus 7. The serial CCU 28 connects the managed apparatus to the data communication apparatus 7 and/or to a personal I/F 18 of another managed apparatus.

Figure 4:
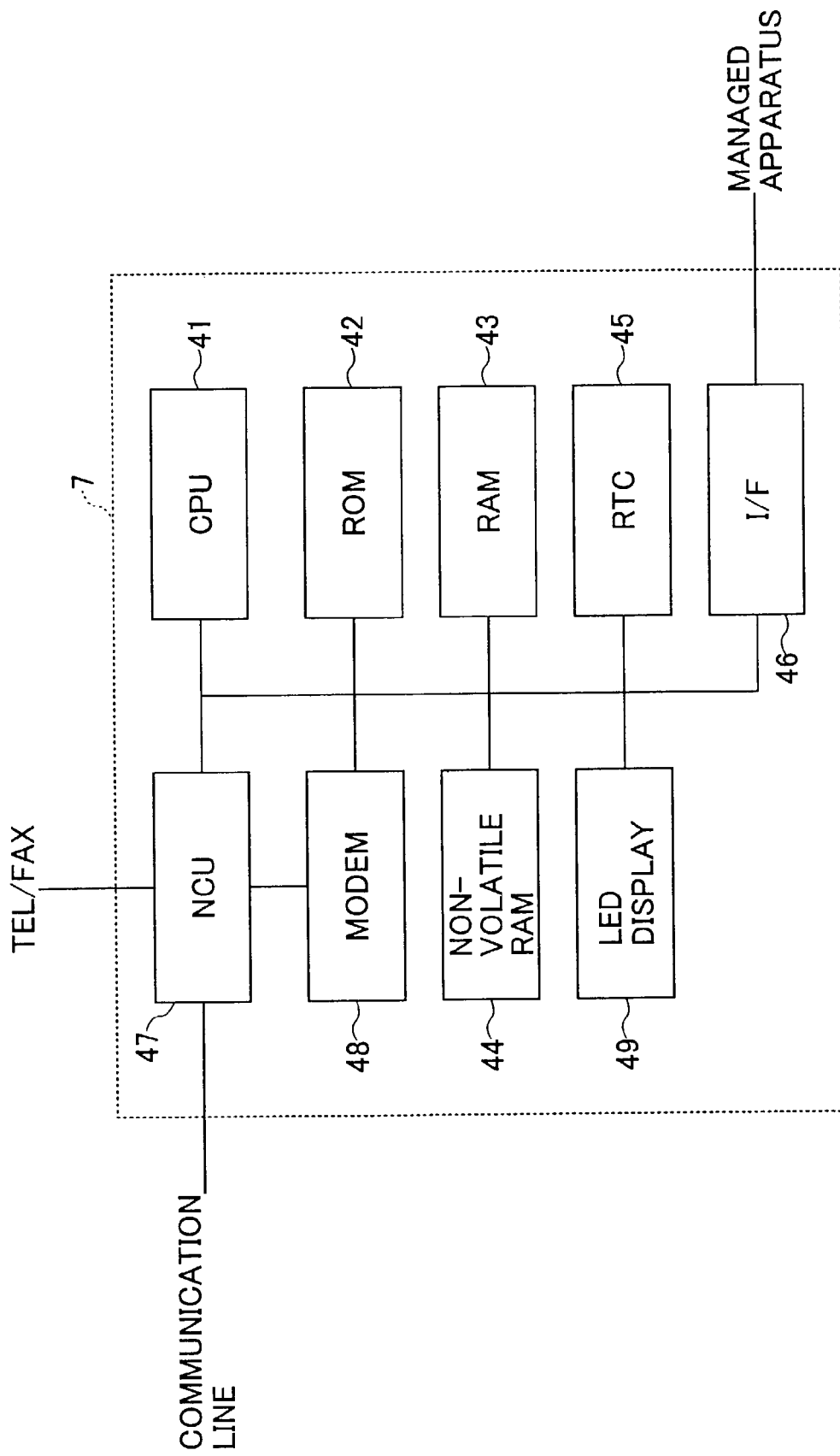
FIG. 4 is a system block diagram showing a first embodiment of a data communication apparatus according to the present invention.

FIG. 4 is a system block diagram showing a structure of a first embodiment of the data communication apparatus according to the present invention. More particularly, FIG. 4 shows the structure of the data communication apparatus 7 shown in FIG. 1.

The data communication apparatus 7 includes a CPU 41, a ROM 42, a RAM 43, a non-volatile RAM 44, a real time clock (RTC) circuit 45, a managed apparatus interface (I/F) 46, a network control unit (NCU) 47, a modem 48, and a light emitting diode (LED) display part 49 which are connected as shown in FIG. 4.

The CPU 41 carries out the following control operations based on computer programs and various data stored in the ROM 42. In other words, the CPU 41 controls the plurality of managed apparatuses 1 through 5, controls sending and receiving of instruction signals with respect to the central managing apparatus 6 via the communication line 8 by the NCU 47, calls the central managing apparatus 6 via the communication line 8 depending on various notification information from the managed apparatuses 1 through 5, and controls switching (including control of line switching timing) between the connection of the communication line 8 to the managed apparatuses 1 through 5 and the connection of the communication line 8 to a general telephone set (TEL) or a facsimile machine (FAX), so as to generally control the entire data communication apparatus 7.

The CPU 41 uses the RTC circuit 45, the managed apparatus I/F 46, the NCU 47 and the modem 48 if necessary during operation, so as to realize the functions of a connecting means (or section), a status information sending means (or section), a parameter set means (or section), a test communication means (or section) and the like of the present invention.

The RAM 43 forms a temporary memory which is usable as a work memory when the CPU 41 carries out a data processing or the like. The non-volatile RAM 44 stores sending data (status information and the like) which are transmitted from the central managing apparatus 6 to the plurality of managed apparatuses 1 through 5 or vice versa, and various parameters. The various parameters include a device code and an ID code (for example, the telephone number (device address) of the data communication apparatus 7 and a model number of the managed apparatus) for specifying one of the plurality of managed apparatuses 1 through 6, a called telephone number, line type information, a number of re-calls made (number of re-dialings made) in a case where a line connection is unsuccessful, an interval of re-calls (re-dialing wait time), and the like. The non-volatile RAM 44 is backed up by a battery (not shown), and maintains the stored contents thereof even when the power of the data communication apparatus 7 is turned OFF.

FIG. 5 is a diagram showing the various parameters which are set and stored in a parameter storage area of the non-volatile RAM 44 within the data communication apparatus 7. FIG. 5 shows the various parameters for a case where the managed apparatuses 1 through 5 are plain paper copying machines (PPCs).

The various parameters shown in FIG. 5 include a called telephone number, a re-dialing wait time and a number of re-dialings made with respect to each call (status information), a PPC model number and a counter totaling day with respect to each of the device addresses D0 through D4, an alarm call notifying time, a counter call notifying time, line type information, parameter log information identifier, and the like.

In this embodiment, a service person call (SC) and/or manual call (MC) telephone number, an alarm call telephone number, and a counter call telephone number respectively correspond for example to the called telephone number, that is, the telephone number of the central managing apparatus 6, and are used when calling the central managing apparatus 6.

The PPC model number of the device address (device code) D0 corresponds to the model number of the managed apparatus 1, the PPC model number of the device address D1 corresponds to the model number of the managed apparatus 2, the PPC model number of the device address D2 corresponds to the model number of the managed apparatus 3, the PPC model number of the device address D3 corresponds to the model number of the managed apparatus 4, the PPC model number of the device address D4 corresponds to the model number of the managed apparatus 5.

The counter totaling day for the device address D0 is the day on which the counter information stored in a managed apparatus 1-area of a counter memory A is copied to a managed apparatus 1-area of a counter memory C. The counter memories A and C will be described later. The counter totaling day for the device address D1 is the, day on which the counter information stored in a managed apparatus 2-area of the counter memory A is copied to a managed apparatus 2-area of the counter memory C. The counter totaling day for the device address D2 is the day on which the counter information stored in a managed apparatus 3-area of the counter memory A is copied to a managed apparatus 3-area of the counter memory C. The counter totaling day for the device address D3 is the day on which the counter information stored in a managed apparatus 4-area of the counter memory A is copied to a managed apparatus 4-area of the counter memory C. The counter totaling day for the device address D4 is the day on which the counter information stored in a managed apparatus 5-area of the counter memory A is copied to a managed apparatus 5-area of the counter memory C.

The counter call notifying time (counter call calling time) is the time at which the counter information stored in the counter memory C is notified (sent) to the central managing apparatus 6 as the counter call information (maintenance contract management data). The line type information indicates the type of the line (push-button line, dial-pulse line and the like) which is connected to the data communication apparatus 7, and is used when calling the central managing apparatus 6. The parameter log information identifier is a kind of identification information, such as the date-and-hour information, which enables discrimination of a log of parameter changes made by the central managing apparatus 6.

Although omitted in FIG. 5, a counter information acquiring time when the counter information is to be acquired is also stored in the parameter storage area of the non-volatile RAM 44. The counter information acquiring time and the counter call notifying time are set so that the acquired counter information can be sent periodically to the central managing apparatus 6 as the counter call information at intervals longer that the intervals with which the counter information is acquired. The parameter log information identifier is also set and stored in the parameter storage area of the non-volatile RAM 44, as a parameter, however, the parameter log information identifier may be stored in another area (for example, a storage area exclusively for the parameter log information identifier) of the non-volatile RAM 44. Returning now to the description of FIG. 4, the RTC circuit 45 forms a date-and-hour information generating means (or section) for generating the date-and-hour information which indicates the present date and hour. The CPU 41 can know the present date and hour by reading the date-and-hour information generated by the RTC circuit 45. The managed apparatus I/F 46 forms a serial communication interface between the data communication apparatus 7 and the managed apparatuses 1 through 5 which are targets to be remotely managed. The NCU 47 is provided to connect the data communication apparatus 7 to the communication line 8 in a manner capable of making a communication therebetween, and includes an automatic calling and call receiving function.

The modem 48 modulates data to be sent, and demodulates the modulated data that is received. In other words, when sending the data (information) to the central managing apparatus 6, the modem 48 modulates the data into a format suited for transmission through the communication line 8. On the other hand, when the modulated data from the central managing apparatus 6 is received, the modem 48 demodulates the modulated data back into the original data.

The LED display part 49 is provided to display various data and/or messages to the user, such as an ON/OFF state of the power of the data communication apparatus 7, and a message which indicates that the data communication apparatus 7 is not connected to the communication line 8 in a manner capable of making a communication therebetween.

Next, a description will be given of the general functions of the remote managing system described above. The remote managing system basically includes the following 3 kinds of functions (f11) through (f13)

(f11) Communication control from the central managing apparatus 6 to the managed apparatuses 1 through 5.

(f12) Communication control from the managed apparatuses 1 through 5 to the central managing apparatus 6 or the data communication apparatus 7.

(f13) Control of the data communication apparatus 7 itself.

The function (f11), that is, the communication control from the central managing apparatus 6 to the managed apparatuses 1 through 5 includes the following controls (a1) through (c1), for example.

(a1) Reading and resetting of the counter information such as a total number of images formed (counted number of images formed), a number of images formed for each paper supply stage (paper supply tray), a number of-images formed for each transfer sheet (paper) size, a number of paper misfeeds, a number of paper misfeeds for each transfer paper size, and a number of paper misfeeds for each transfer paper transport position, for a specific managed apparatus.

(b1) Setting and reading of adjusting values such as control voltage, current, resistance and timing, for each part of the managed apparatus.

(c1) Returning a result (text data) with respect to the communication control from the managed apparatuses 1 through 5 to the central managing apparatus by the function (f12) described above.

The controls (a1) through (c1) are carried out by a selecting operation from the data communication apparatus 7 to the managed apparatuses 1 through 5, in response to an instruction signal from the central managing apparatus 6. The selecting operation of the data communication apparatus 7 refers to the function of selecting and communicating with a desired one of the 5 managed apparatuses 1 through 5 which are connected to the data communication apparatus 7.

Next, a description will be given of the selecting operation of the data communication apparatus 7.

Each of the managed apparatuses 1 through 5 has a specific device code, and the data communication apparatus 7 sends a selecting signal (SA) which is formed by a specific code (or a combination of codes) indicating a predetermined selecting function, and a device code of the managed apparatus which is to be selected, to the serial communication interface RS-485 via the managed apparatus I/F 46. In addition, based on the selecting signal, each of the managed apparatuses 1 through 5 compares the device code thereof and the following device code, and recognizes that the managed apparatus is selected when the 2 device codes match. The selected managed apparatus outputs a busy response which is formed a predetermined specific code (or a combination of codes) when a data to be sent exists.

On the other hand, when no data to be sent exists, the selected managed apparatus judges whether or not it is possible to cope with the selection, and communicates with the data communication apparatus 7 by outputting an acknowledge response which is formed by a predetermined specific code (or a combination of codes) if it is possible to cope with the selection. When no data to be sent exists and the selected managed apparatus cannot cope with the selection, the selected managed apparatus outputs a non-acknowledge response which is formed by a predetermined specific code (or a combination of codes), and ends the communication with the data communication apparatus 7.

In a case where the managed apparatus corresponding to the device code output from the data communication apparatus 7 cannot output an acknowledge response or a non-acknowledge response due to some reason, such as when the power of the managed apparatus is turned OFF, the data communication apparatus 7 ends the selecting operation after a predetermined time elapses.

Figure 6:
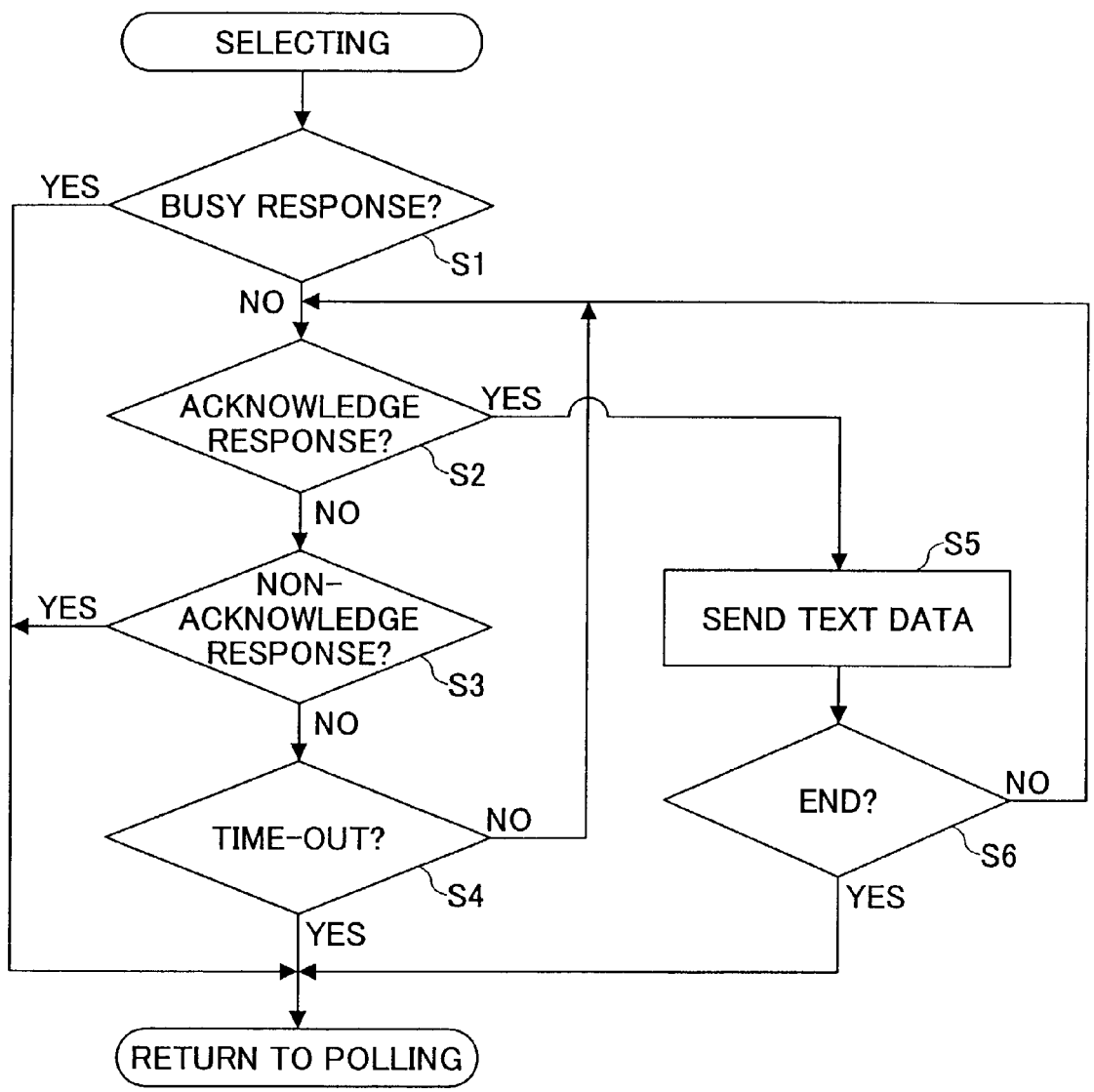
FIG. 6 is a flow chart for explaining a selecting operation of the data communication apparatus.

FIG. 6 is a flow chart for explaining the selecting operation of the data communication apparatus 7. A selecting process shown in FIG. 6 is carried out by the CPU 41 shown in FIG. 4.

In FIG. 6 a step S1 decides whether or not a busy response is received from the selected managed apparatus. If the decision result in the step S1 is YES, the selecting process ends, and the process advances to a polling operation which will be described later. On the other hand, if the decision result in the step S1 is NO, a step S2 decides whether or not an acknowledge response is received from the selected managed apparatus. If the decision result in the step S2 is NO, a step S3 decides whether or not a non-acknowledge response is received from the selected managed apparatus. The selecting process ends if the decision result in the step S3 is YES.

If the decision result in the step S3 is NO, a step S4 decides whether or not a predetermined time has elapsed (time-out has occurred), and the selecting process ends if the decision result in the step S4 is YES. On the other hand, if the decision result in the step S4 is NO, the process returns to the step S2.

If the decision result in the step S2 is YES, a step S5 makes a text data transmission to send text data with respect to the selected managed apparatus. In addition, a step S6 decides whether or not the text data transmission with respect to the selected managed apparatus ended, and the process returns to the step S2 if the decision result in the step S6 is NO. The selecting process ends if the decision result in the step S6 is YES.

The function (f12), that is, the communication control from the managed apparatuses 1 through 5 to the central managing apparatus 6 or the data communication apparatus 7, includes the following controls (a2) through e2), for example.

(a2) When an abnormality (failure) which makes it impossible to carry out an image forming operation is generated, each of the managed apparatuses 1 through 5 immediately sends information (emergency call information) indicative of the abnormality to the central managing apparatus 6 via the data communication apparatus 7 and the communication line 8 (emergency notification).

(b2) Responsive to a key operation made by the user on the operation panel, each of the managed apparatuses 1 through 5 changes from an image forming mode to a user request input mode (which is different from the image forming mode) in which the user inputs the necessary request (for example, a repair request or a supply replenishing request), and displays a user request input screen on the display part of the operation panel. When the user inputs the necessary request by pushing a predetermined key on the user request input screen, a corresponding request information (emergency call information) is immediately sent to the central managing apparatus 6 via the data communication apparatus 7 and the communication line 8 (emergency notification).

(c2) Every time the counted number of images formed reaches a predetermined number (number in contract), each of the managed apparatus 1 through 5 immediately sends information (emergency call information), such as the counted number of images formed and order information regarding the transfer paper, to the central managing apparatus 6 via the data communication apparatus 7 and the communication line (emergency notification).

(d2) Each of the managed apparatuses 1 through 5 sends information indicative of the counted number of images formed to the data communication apparatus 7 at predetermined time intervals, and the data communication apparatus 7 collects the received information until a specified hour of the appointed day (which is set by the central managing apparatus 6 and stored in the non-volatile RAM 44 within the data communication apparatus 7). At the specified hour of the appointed day, the data communication apparatus 7 sends the information collected up to that hour to the central managing apparatus 6 via the communication line 8 (non-emergency notification). When carrying out this communication control, if a number of times the received information is notified reaches a predetermined number before the specified hour arrives, the received information may be sent to the central managing apparatus 6 before the specified hour arrives.

(e2) Each of the managed apparatuses 1 through 5 can start an image forming operation, but sends information indicating a phenomenon which requires attention, such as prevention and maintenance, to the data communication apparatus 7 when such a phenomenon occurs. Such a phenomenon includes a case where a number of times a replaceable part is used reaches a specified number, a running time for which a replaceable part is operated reaches a specified time, and an output level of a sensor reaches a specified level. The data communication apparatus 7 collects the received information until a specified hour of the appointed day (which is set by the central managing apparatus 6 and stored in the non-volatile RAM 44 within the data communication apparatus 7). At the specified hour of the appointed day, the data communication apparatus 7 sends the information collected up to that hour to the central managing apparatus 6 via the communication line 8 (non-emergency notification). When carrying out this communication control, if a number of times the received information is notified reaches a predetermined number before the specified hour arrives, the received information may be sent to the central managing apparatus 6 before the specified hour arrives.

The controls (a2) through (e2) described above are carried out when the polling operation is made from the data communication apparatus 7. The polling operation refers to the function of sequentially specifying the 5 managed apparatuses 1 through 5 which are connected to the data communication apparatus 7 and confirming whether or not a communication request from the specified managed apparatus exists.

Next, a description will be given of the polling operation of the data communication apparatus 7.

The data communication apparatus 7 sends a polling signal (PA) which is formed by a specific code (or a combination of codes) indicating a predetermined polling function, and the device code of the managed apparatus which is to be selected, to the serial communication interface RS-485 via the managed apparatus I/F 46. Based on the polling signal, each of the managed apparatuses 1 through 5 compares the following device code and the device code thereof, and recognizes that the managed apparatus is polled if the two device codes match.

The polled managed apparatus starts a communication with the data communication apparatus 7 if a transmitting data to be transmitted (communication request with respect to the data communication apparatus 7 or the central managing apparatus 6) exists. The polled managed apparatus outputs an end response which is formed by a predetermined specific code (or a combination of codes) to end the communication with the data communication apparatus 7 if no communication request exists or the started communication ends. When the end response is received from the polled managed apparatus, the data communication apparatus 7 polls the next managed apparatus.

In addition, in a case where the managed apparatus corresponding to the device code output from the data communication apparatus 7 cannot start the communication or cannot output the end response because the power of the managed apparatus is turned OFF, for example, the data communication apparatus 7 ends the polling operation after a predetermined time elapses.

Figure 7:
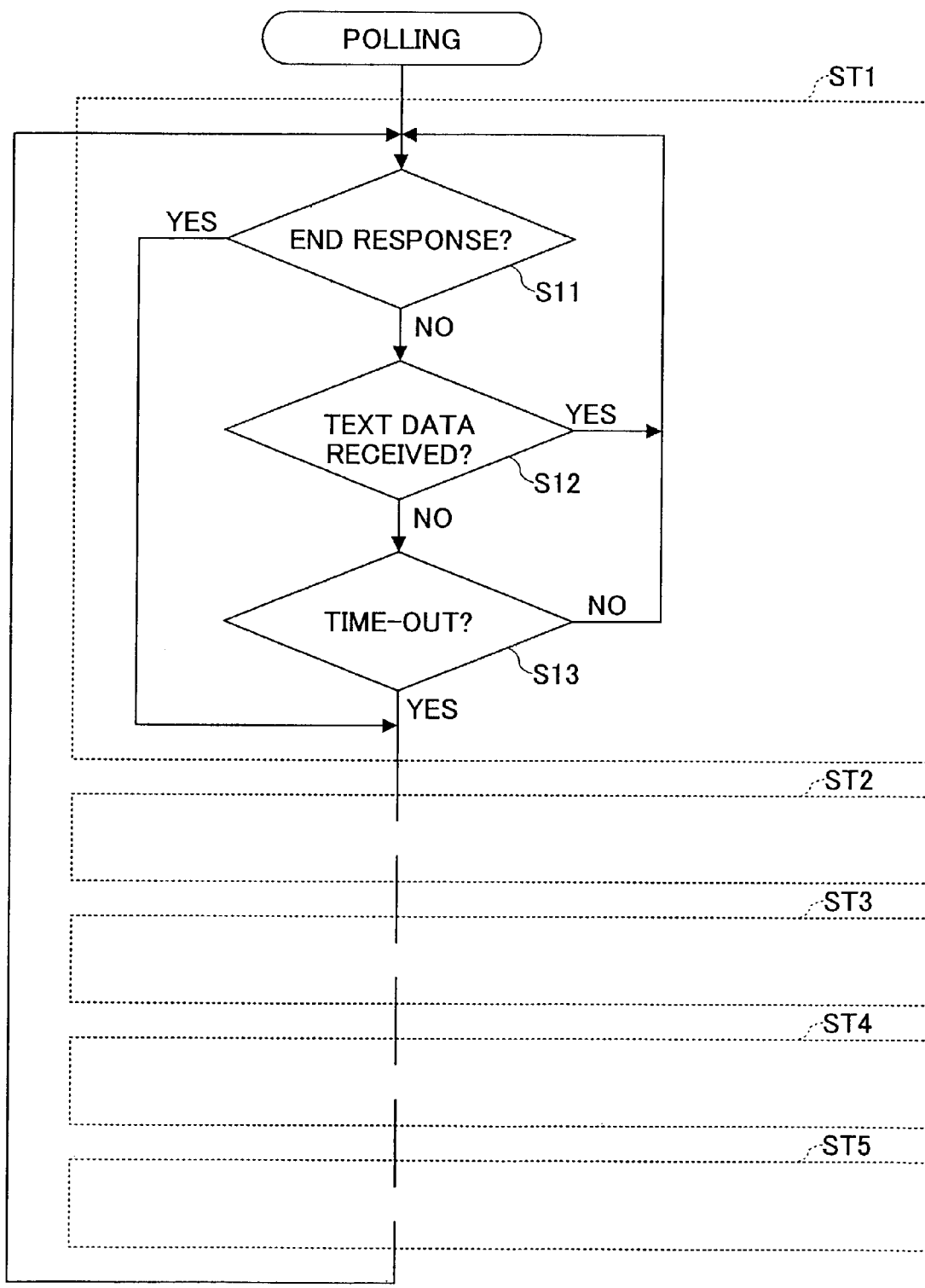
FIG. 7 is a flow chart for explaining a polling operation.

FIG. 7 is a flow chart for explaining the polling operation of the data communication apparatus 7. A polling process shown in FIG. 7 is carried out by the CPU 41 shown in FIG. 4.

The polling process shown in FIG. 7 includes a polling process ST1 with respect to the managed apparatus 1, a polling process ST2 with respect to the managed apparatus 2, a polling process ST3 with respect to the managed apparatus 3, a polling process ST4 with respect to the managed apparatus 4, and a polling process ST5 with respect to the managed apparatus 5. Each of the polling processes ST1 through ST5 include the same steps and are the same, except for the managed apparatus which is the polling target. Hence, for the sake of convenience, only the processing contents of the polling process ST1 with respect to the managed apparatus 1 are shown in FIG. 7.

In FIG. 7, the polling process ST1 includes steps S11 through S13. The step S11 decides whether or not an end response is received from the managed apparatus (in this case, the managed apparatus 1) which is the polling target. If the decision result in the step S11 is YES, the process advances to the polling process (in this case, the polling process ST2) with respect to the next managed apparatus (in this case, the managed apparatus 2). If the decision result in the step S11 is NO, the step S12 decides whether or not a text data is received from the managed apparatus which is the polling target. The process returns to the step S11 if the decision result in the step S12 is YES. On the other hand, if the decision result in the step S12 is NO, the step S13 decides whether or not a predetermined time has elapsed (time-out has occurred). The process returns to the step S11 if the decision result in the step S13 is NO. If the decision result in the step S13 is YES, the process advances to the polling process (in this case, the polling process ST2) with respect to the next managed apparatus (in this case, the managed apparatus 2).

After the polling process ST5 with respect to the last managed apparatus (in this case, the managed apparatus 5), the process returns to the polling process ST1 with respect to the first managed apparatus (in this case, the managed apparatus 1). Therefore, the polling process is successively repeated with respect to the managed apparatuses 1 through 5 which are connected to the data communication apparatus 7 unless the selecting process is generated.

A polling operation of the central managing apparatus 6 is similar to the polling operation of the data communication apparatus 7 described above, except that the polling operation of the central managing apparatus 6 is carried out via the data communication apparatus 7. A polling process of the central managing apparatus 6 is carried out by a CPU within a main body 103 of the central managing apparatus 6 shown in FIG. 11 which will be described later.

The function (f13), that is, the control within the data communication apparatus 7, includes the following controls (a3) and (b3), for example.

(a3) Reading of the counted value within each of the managed apparatuses 1 through 5, that is, the counter information stored in the non-volatile RAM 15.

(b3) Returning of the result of a communication from the managed apparatuses 1 through 5 to the data communication apparatus 7 by the communication control of the function (f12) described above.

The control (a3) which reads the counted value (counter information) is carried out by the selecting operation which is carried out once a day at a predetermined hour, for example, from the data communication apparatus 7 to the managed apparatuses 1 through 5. For example, the predetermined hour once a day is 0:00 (0 hour 0 minute). Such a timing (time) of the selecting operation may be set by the user by operating the operation panel of the data communication apparatus 7 or, set in advance from the central managing apparatus 6 via the communication line 8. In a case where the power of the managed apparatus is turned OFF at the time when the selecting operation is carried out, however, the predetermined hour once a day is the hour when the power of the managed apparatus is first turned ON after this predetermined hour.

In this embodiment, it is assumed for the sake of convenience that the 3 counter memories A, B and C described above for storing the counter information are prepared within the non-volatile RAM 44 of the data communication apparatus 7. In addition, it is assumed that the counter information which is read once a day at the predetermined hour by the selecting operation is written into the counter memory A. Accordingly, the counter information of the previous day stored in the counter memory A is rewritten and updated every day, except on a holiday or the like when the power of the managed apparatus is not turned ON all day. When rewriting the counter information of the previous day, the counter information stored in the counter memory A is first copied to the counter memory B and saved. In other words, the previous counter information (counter information read previously) which is read at the timing immediately preceding the timing at which the present counter information is read by the data communication apparatus 7 from the managed apparatuses 1 through 5, is written into the counter memory B. Furthermore, the counter information stored in the counter memory A is copied to the counter memory C and saved once a month at a predetermined date and hour, for example. The predetermined date and hour once a month is set and stored in the non-volatile RAM 44 within the data communication apparatus 7 via the communication line 8 by a request from the central managing apparatus 6.

The counter information which is sent from the data communication apparatus 7 to the central managing apparatus 6 as the counter call information (also referred to as counter confirmation data) becomes the counter information stored in the counter memory C. In this case, the counter call information can be sent from the data communication apparatus 7 to the central managing apparatus 6 according to the following 2 sending methods (a4) and (b4).

(a4) The central managing apparatus 6 reads the counter information stored in the counter memory C of the data communication apparatus 7 on or after the above described date and hour (date and hour when the contents of the counter memory A are copied to the counter memory C). In other words, an access is made to the data communication apparatus 7 (by calling and sending a corresponding read instruction), and the contents of the counter memory C (counter information of each of the managed apparatuses 1 through 5) sent from the data communication apparatus 7 is acquired as the counter call information.

(b4) The data communication apparatus 7 calls itself at a counter call notifying time (counter call calling time) which is on or after the above described date and hour, and sends the counter information stored in the counter memory C to the central managing apparatus 6, as the counter call information, via the communication line 8. The counter call notifying time when the data communication apparatus 7 calls itself is also set and stored in the non-volatile RAM 44 within the data communication apparatus 7 via the communication line 8 by a request from the central managing apparatus 6.

The data communication apparatus 7 may have a structure including a plurality of memory groups each having a combination of the counter memories A, B and C. In this case, even in a case where the managed apparatuses 1 through 5 are copying machines having various copy modes such as a black-and-white copy mode, an application copy mode and a color copy mode, it is possible to cope with various counter values for the black-and-white copy, the application copy, the color copy and the like.

Figure 8:
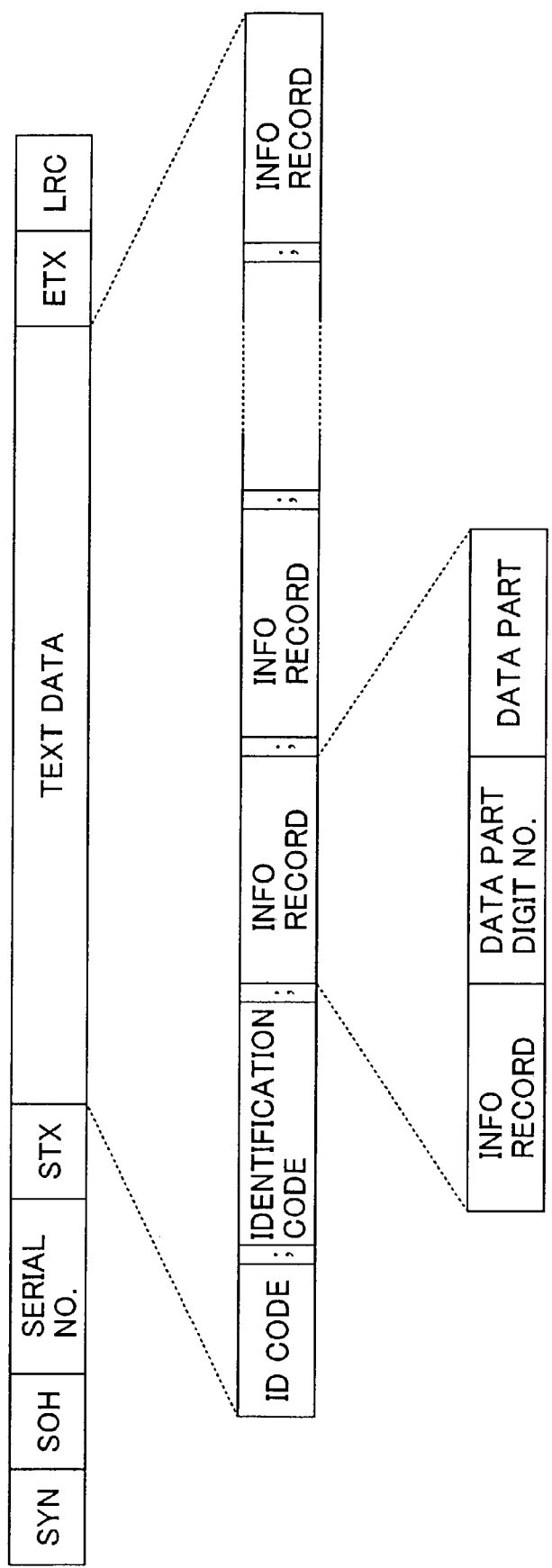
FIG. 8 is a diagram showing a structure of data exchanged between a central managing apparatus and the data communication apparatus.

FIG. 8 is a diagram showing a structure of data exchanged between the central managing apparatus 6 and the data communication apparatus 7. In FIG. 8, an upper portion shows the structure of 1 communication block during 1 communication, a central portion shows the structure of text data within 1 communication block, and a lower portion shows the structure of information record within the text data.

1 communication block shown in the upper portion of FIG. 8 includes a synchronizing field SYN (Synchronize) which indicates a start of the data, a header field SOH (Start of Header) which indicates a start of a header, a serial number which indicates a communication block number within 1 communication (transmission), a text start field STX (Start of Text) which indicates a start of the text data, the text data, a text end field ETX (End of Text) which indicates an end of the text data, and a longitudinal parity LRC (Longitudinal Redundancy Check). It is assumed that the serial number is "01" for the first communication block, is successively incremented by 1 for the second and subsequent communication blocks, and becomes "00" after "99".

The text data shown in the central portion of FIG. 8 includes an ID code, an identification code, and information records. The ID code is used for specifying the data communication apparatus 7 and one of the managed apparatuses 1 through 5 which are connected to the data communication apparatus 7. The ID code is formed by the telephone number of the data communication apparatus 7 and the model number of one of the managed apparatuses 1 through 5. The identification code is formed by a code (process code) which indicates a kind of communication objective, added with a sending source and a a receiving destination of the text data. In this embodiment, the process name and the process contents of the process code are defined as shown in the following Table 1.

TABLE 1

| Code | Process Name | Process Contents |
| --- | --- | --- |
| 30 | SC Call | Automatic notification upon SC generation |
| 31 | Manual Call | Automatic notification upon pushing manual switch |
| 32 | Alarm Transmission | Automatic notification upon alarm generation |
| 21 | Counter Call | Notification of counter information |
| 22 | Block Billing | Automatic notification to indicate block billing number reached |
| 02 | Data Read | Read internal data of PPC |
| 04 | Data Write | Rewrite internal data of PPC |
| 03 | Execute | Execute test, etc. by remote control |
| 08 | Device Code Confirmation | Check communication function |

The information record shown in the lower portion of FIG. 8 includes an information code, a data part digit number, and a data part. In this embodiment, the data length and contents of the information record are defined as shown in the following Table 2.

TABLE 2

| Code | Data Length | Contents |
| --- | --- | --- |
| Information Code | 11 | Indicates particular kind of information |
| Data Part Digit Number | 2 | Indicates data length of following data part in ASCII code. "00" when no data part exists |
| Data Part | Variable Length | Data indicating contents of each information code. This field does not exist when the data part digit number is "00". |

A separator indicated by a semicolon (;) is inserted between the ID code and the identification code, between the identification code and the information record, and between the information records.

Figure 9:
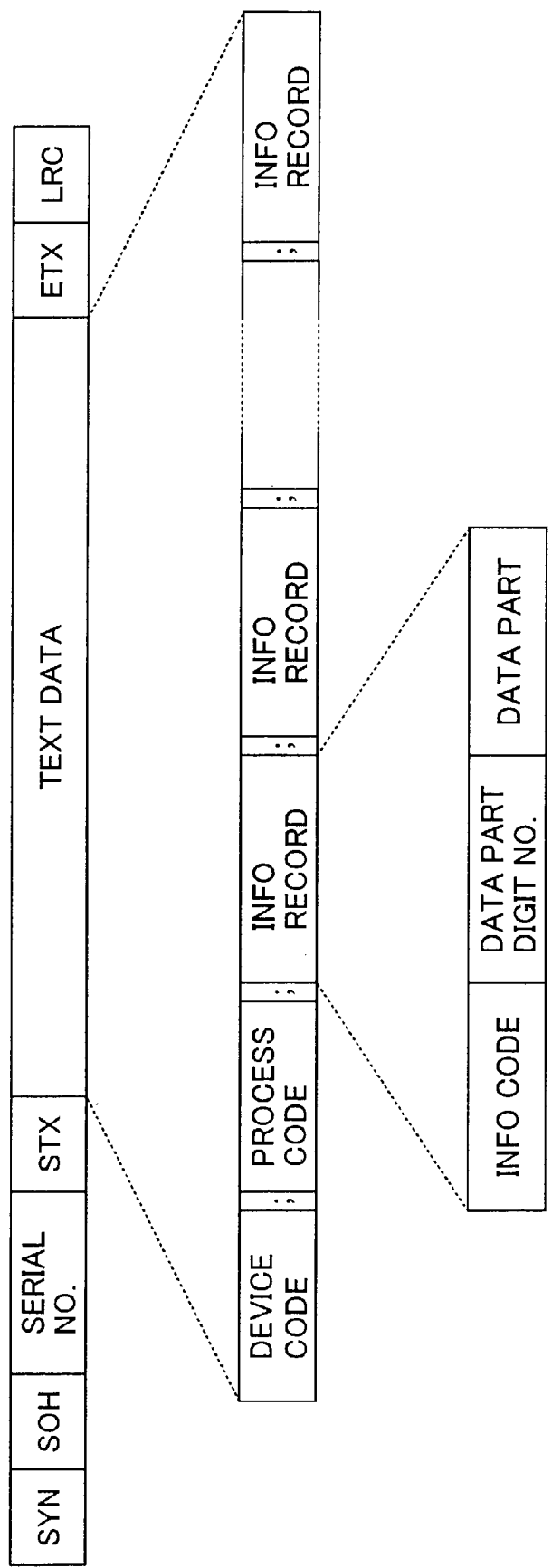
FIG. 9 is a diagram showing a structure of data exchanged between the data communication apparatus and the personal interface of the managed apparatus.

FIG. 9 is a diagram showing a structure of data exchanged between the data communication apparatus 7 and the personal I/F 18 of the managed apparatuses 1 through 5. In FIG. 9, an upper portion shows the structure of 1 communication block during 1 communication, a central portion shows the structure of text data within-1 communication block, and a lower portion shows the structure of information record within the text data. In FIG. 9, a description of those parts which are the same as those corresponding parts shown in FIG. 8 will be omitted.

The text data shown in the central portion of FIG. 9 includes a device code, a process code, and information records. The device code is set to a code peculiar to each of the managed apparatuses 1 through 5 by the-device code setting switch 30 shown in FIG. 3, for each of the managed apparatuses 1 through 5. A relationship between the device code and the ID code shown in FIG. 8 is read from the managed apparatus and stored in the non-volatile RAM 44 within the data communication apparatus 7 when the managed apparatus is initially installed and connected to the data communication apparatus 7, and is appropriately converted thereafter depending on a direction in which the text data is sent.

The process code shown in FIG. 9 indicates the kind of communication objective, as described above. The process code shown in FIG. 9 corresponds to the identification code shown in FIG. 8 but without the sending source and the receiving destination of the text data. The process code shown in FIG. 9 is appropriately added or deleted by the data communication apparatus 7 depending on the direction in which the text data is sent.

Figure 10:
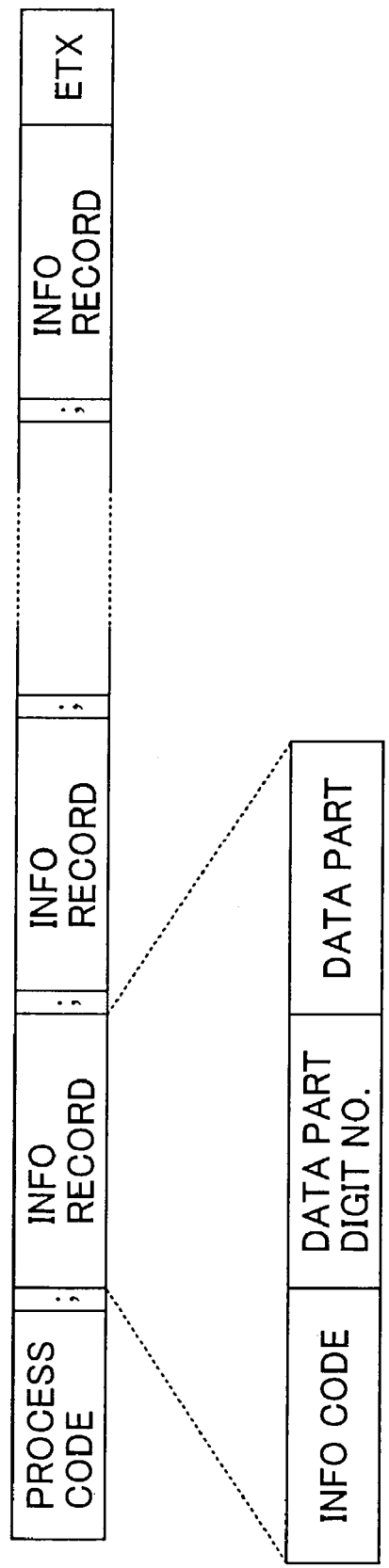
FIG. 10 is a diagram showing a structure of data exchanged between the personal interface of the managed apparatus and a PPC controller.

FIG. 10 is a diagram showing a structure of data exchanged between the personal I/F 18 of the managed apparatuses 1 through 5 and the PPC controller 31 shown in FIG. 3. In FIG. 10, an upper portion shows the structure of 1 communication block, and a lower portion shows the structure of the information record within 1 communication block.

The 1 communication block shown in FIG. 10 corresponds to the 1 communication block shown in FIG. 9 which is exchanged between the data communication apparatus 7 and the personal I/F 18 but without the header part, the device code and the parity part. In addition, the structure of the information record shown in FIG. 10 is the same as that of the information record shown in FIG. 9.

Figure 11:
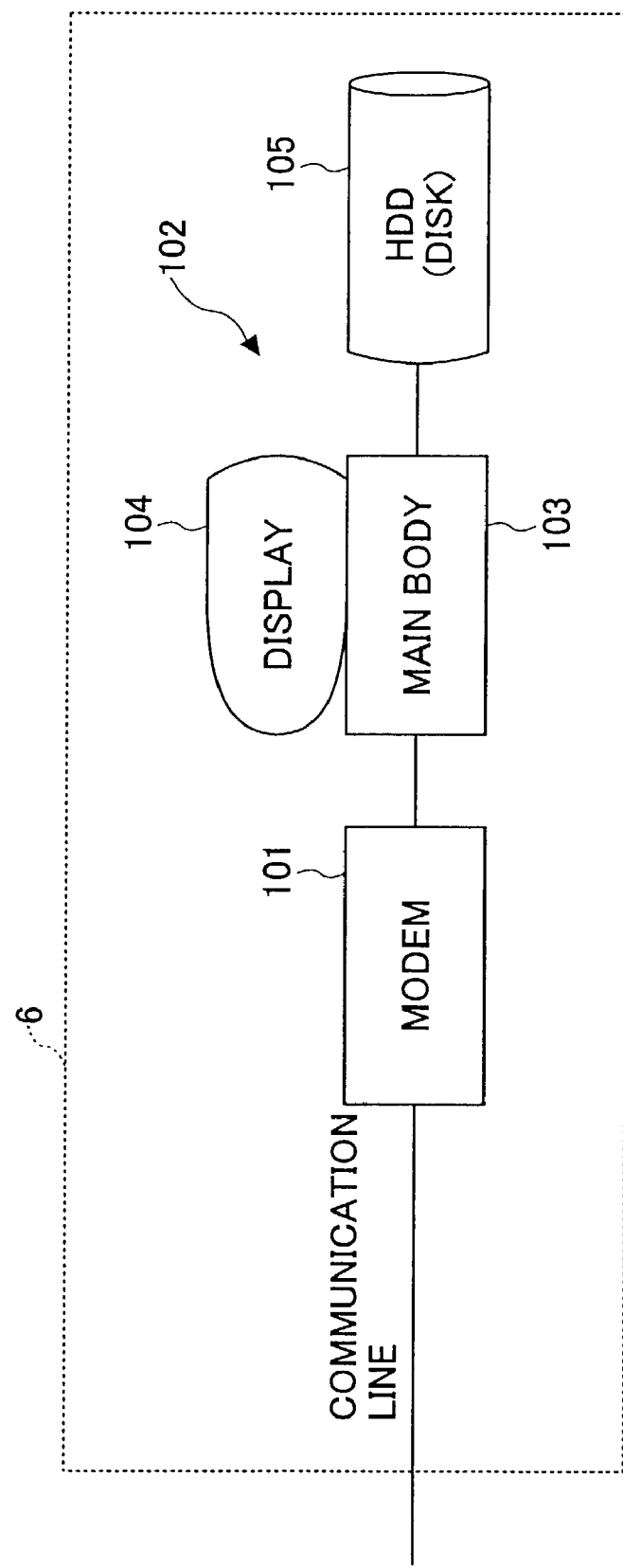
FIG. 11 is a system block diagram showing a general structure of a first embodiment of the central managing apparatus according to the present invention.

FIG. 11 is a system block diagram showing a general structure of the first embodiment of the central managing apparatus according to the present invention. More particularly, FIG. 11 shows the general structure of the central managing apparatus 6.

The central managing apparatus 6 includes a modem unit 101 and a communication terminal equipment 102 which are connected as shown in FIG. 11. The communication terminal equipment 102 includes a main body 103 and a display 104.

The main body 103 includes a control section which is formed by a microcomputer, and a hard disk drive (HDD) 105 having at least one hard disk. The microcomputer includes a ROM which stores computer programs, a CPU which carries out various controls by executing the computer programs, a RAM to which a data read access and a data write access can be made, and the like. The functions of a parameter sending means (or section), a parameter changing means (or section), an identification information adding means (or section) and the like of the present invention are realized by the cooperation of the main body 103 and the modem unit 101.

The communication terminal equipment 102 is connected to the modem unit 101 via a serial interface such as RS232C. Accordingly, the communication terminal equipment 102 is connected to the data communication apparatus 7 via the modem unit 101 and the communication line 8 in a manner capable of communicating with the data communication apparatus 7. Hence, the communication terminal equipment 102 can communicate with the data communication apparatus 7.

The display 104 displays various data including the data received from the data communication apparatus 7.

The HDD 105 uses the hard disk to store a database (DB) and the like. The database (DB) stores management data for managing the managed apparatuses 1 through 5 of the user and the data communication apparatus 7, various parameters (excluding the parameter log information identifier) similar to the various parameters shown in FIG. 5 and sent to the data communication apparatus 7 of the user, and parameter log information identifiers added to the various parameters, and the like. The management data include a user ID (for example, the telephone number of the data communication apparatus 7 of the user) for identifying the user, a model number of the managed apparatuses 1 through 5 connected to the data communication apparatus 7 of the user, data received from the data communication apparatus 7, and the like. The HDD 105 functions as a means (or section) for storing the parameters sent to the data communication apparatus 7 and the parameter log information identifiers (or other identification information) added to the parameters in a corresponding relationship to each other.

FIG. 12 is a diagram showing a corresponding relationship of a portion of the parameters and the parameter log information identifiers stored in the database (DB) within the HDD 105 of the central managing apparatus 6. FIG. 12 shows a case where the parameter log information identifiers are date-and-hour information.

In FIG. 12, "DP" and "PB" indicate the line type information used when calling from the data communication apparatus 7, where "DP" denotes a dial-pulse line, and "PB" denotes a push-button line. In addition, "0" indicates an external selection signal which is added immediately before the called telephone number (telephone number of the central managing apparatus 6) which is used when calling from the data communication apparatus 7. "WITHOUT-0" indicates that no "0" is added immediately before the called telephone number, and "WITH-0" indicates that the "0" is added immediately before the called telephone number. For example, a parameter log information identifier "08161125" indicates the date which is August 16 and the hour which is 11:25.

The CPU 41 of the data communication apparatus 7 shown in FIG. 4 stores the status information such as the counter information acquired from the managed apparatuses 1 through 5 in the non-volatile RAM 44, and sends the status information to the central managing apparatus 6 by the NCU 47 and the like, based-on the various parameters shown in FIG. 5 which are set in advance.

The parameters to be stored in the non-volatile RAM 44 are downloaded when setting up the data communication apparatus 7, by the central managing apparatus 6 which makes access to the data communication apparatus 7 via the communication line 8. The downloaded parameters are stored in the parameter storage area of the non-volatile RAM 44 within the data communication apparatus 7.

Based on the parameters, the CPU 41 of the data communication apparatus 7 dials the telephone number for the counter call on the 10th day at 12:00 and sends a dial signal on the communication line 8, so as to call the central managing apparatus 6 (call with respect to the telephone number for the counter call), if the counter totaling day is set to the 10th day and the counter call notifying time is set to 12:00 for the device address D0, for example. When the line from the data communication apparatus 7 to the central managing apparatus 6 is connected (connected state is established), the counter information corresponding to the device address D0 is read from the non-volatile RAM 44, and is sent (notified) to the central managing apparatus 6 as the counter call information.

The parameters within the parameter storage area of the non-volatile RAM 44 are reset (changed) by downloading changed parameters from the central managing apparatus 6 when a change occurs, such as a change in the telephone number (called telephone number) of the central managing apparatus 6, and a change in the counter totaling day required by the user.

Next, a description will be given of a test process which is carried out by the data communication apparatus 7 and the central managing apparatus 6 which form this embodiment of the remote managing system, by referring to FIGS. 13 through 16. The test process employs the first embodiment of the testing method.

Figure 13:
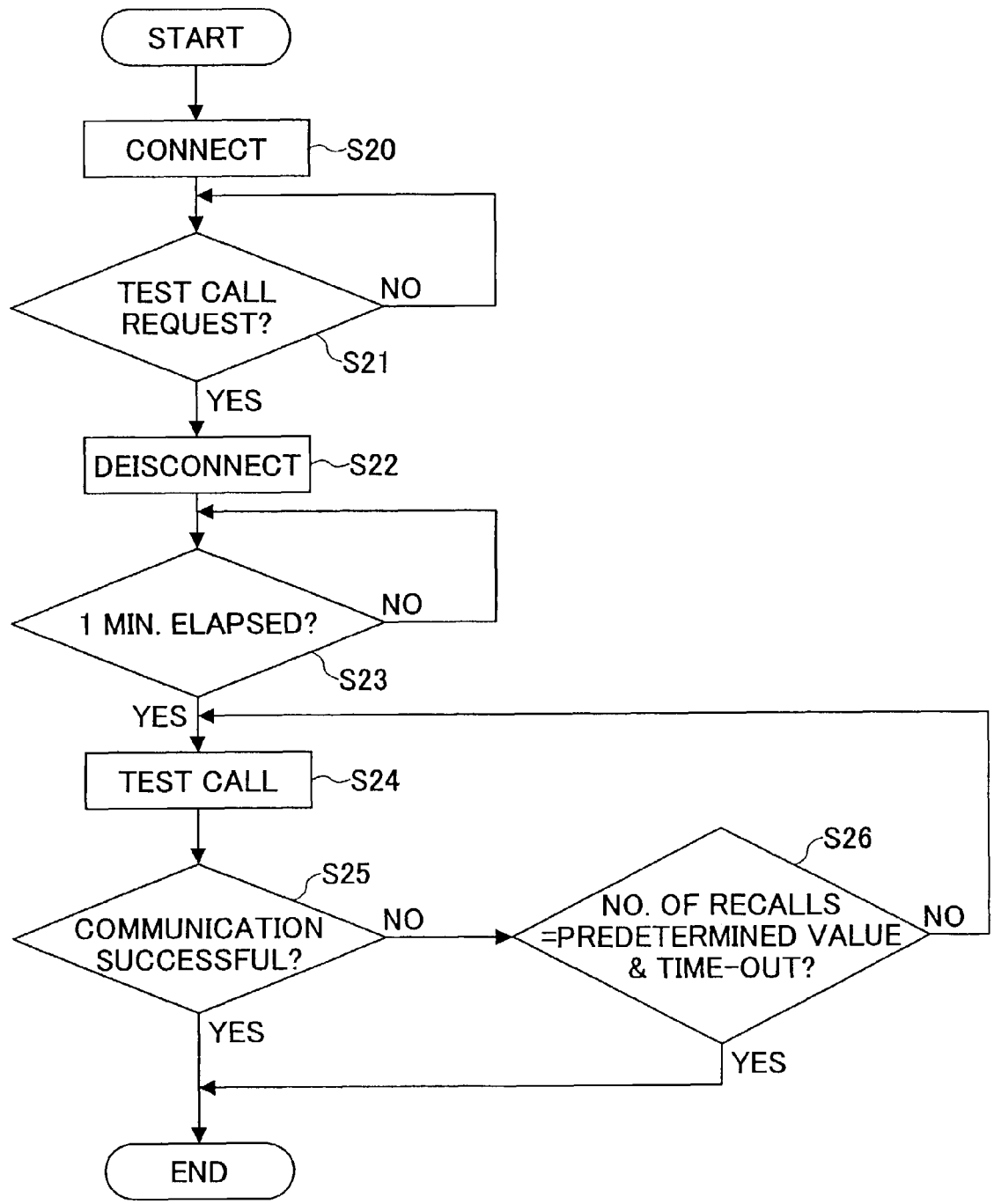
FIG. 13 is a flow chart for explaining a test communication control of the data communication apparatus.
Figure 15:
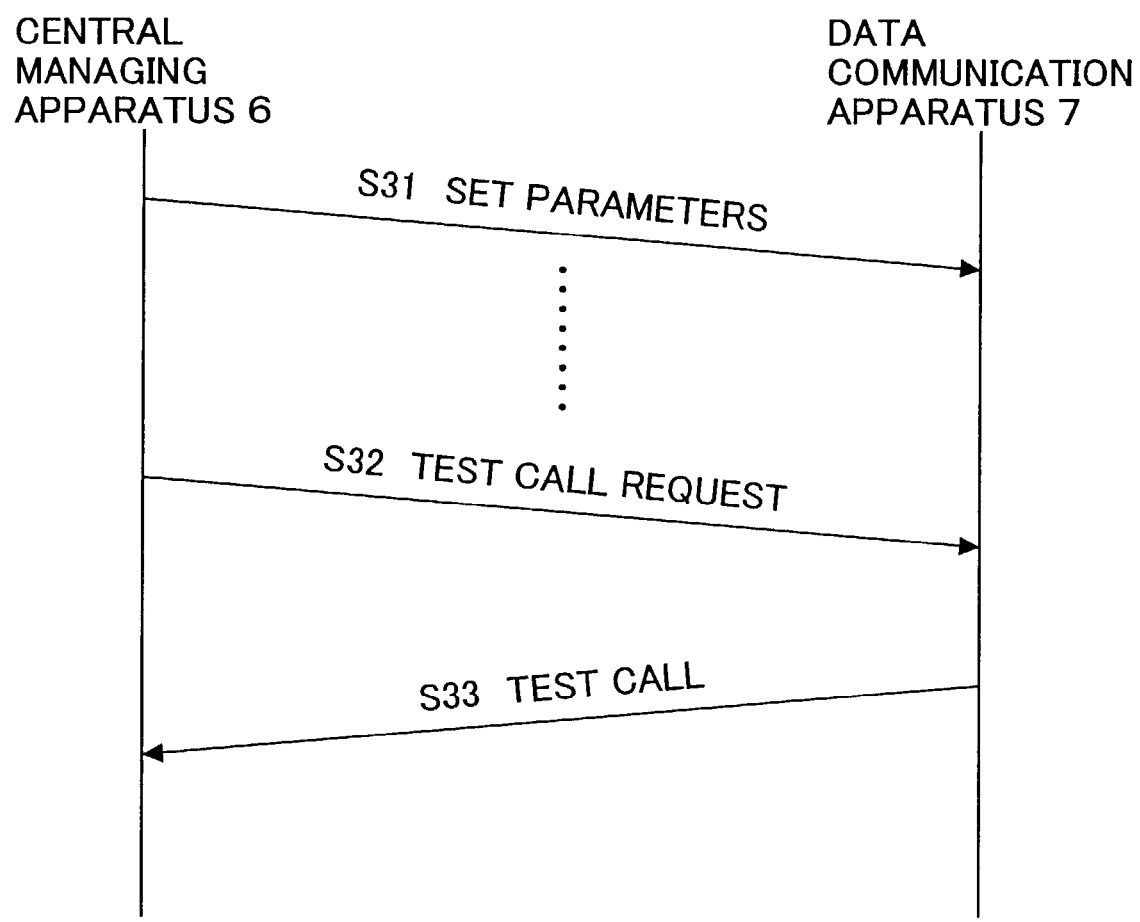
FIG. 15 is a diagram for explaining an example of a communication procedure between the data communication apparatus and the central managing apparatus during the test communication control.
Figure 16:
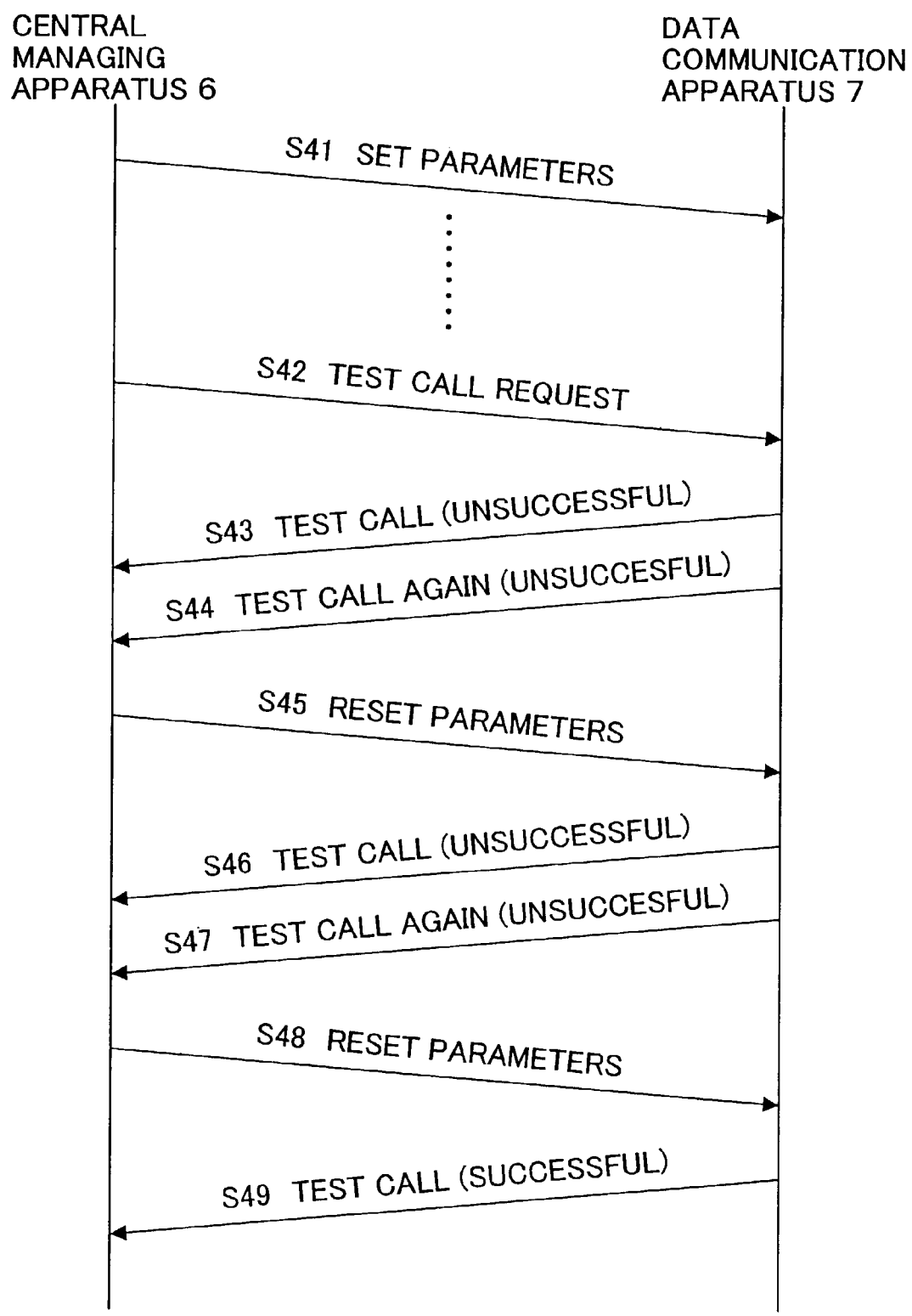
FIG. 16 is a diagram for explaining another example of the communication procedure between the data communication apparatus and the central managing apparatus during the test communication control.

FIG. 13 is a flow chart for explaining a test communication control of the data communication apparatus 7. FIGS. 14A and 14B respectively are diagrams showing a structure (format) of the text data (test call data) exchanged between the central managing apparatus 6 and the data communication apparatus 7 when the data communication apparatus 7 carries out the test communication control. FIG. 15 is a diagram for explaining an example of a communication procedure between the data communication apparatus 7 and the central managing apparatus 6 during the test communication control, and FIG. 16 is a diagram for explaining another example of the communication procedure between the data communication apparatus 7 and the central managing apparatus 6 during the test communication control.

The CPU 41 of the data communication apparatus 7 sends the counter information to the central managing apparatus 6, as the counter call information, on a predetermined day of each month (for example, 1st day of each month). On the other hand, the CPU within the main body 103 of the central managing apparatus 6 makes an access to the data communication apparatus 7 when no counter call is received (no counter call information is received) from the data communication apparatus 7 for a predetermined time (for example, 3 months), so as to acquire the counter information. If the central managing apparatus 6 cannot make access to the data communication apparatus 7 in such a case, the cause may be a failure in the data communication apparatus 7, a physical disconnection of the data communication apparatus 7 from the communication line 8, or the like. However, in a case where the data communication apparatus 7 responds normally with respect to the access from the central managing apparatus 6 but the central managing apparatus 6 cannot acquire the counter information, it means that the data communication apparatus 7 responds to the access from the central managing apparatus 6 but the call from the data communication apparatus 7 is not carried out in a normal manner. In other words, a set-up environment of the data communication apparatus 7 may have changed in such a case. The change in the set-up environment may be caused by a change in the type of line (telephone line or the like) to which the data communication apparatus 7 is connected or, an introduction of a PBX or the like to the line thereby requiring an external selection signal ("0" in this case) to be added before the called telephone number.

Therefore, if the central managing apparatus 6 can make access to the data communication-apparatus 7 but cannot acquire the counter information, the CPU within the main body 103 of the central managing apparatus 6 downloads the changed parameters, having the changed line type information, with respect to the data communication apparatus 7. In this case, the parameter log information identifier which enables discrimination of the log of parameter changes made by the central managing apparatus 6, such as the date-and-hour information (month, date, hour and minutes, each in 2 digits) generated by the real time clock circuit (or system clock, not shown) within the main body 103 of the central managing apparatus 6, is added to the parameters which are downloaded. Thereafter, the CPU within the main body 103 of the central managing apparatus 6 makes a test call request (test communication request) for the counter call with respect to the data communication apparatus 7.

The CPU 41 of the data communication apparatus 7 periodically starts a test communication control process shown in FIG. 13. A start timing of the test communication control process may be set in advance at the data communication apparatus 7 by the user or, set from the central managing apparatus 6 to the data communication apparatus 7. In FIG. 13, a step S20 establishes a connection by connecting the data communication apparatus 7 to the central managing apparatus 6 in a manner capable of making a communication therebetween. A step S21 decides whether or not a test call request is received from the central managing apparatus 6, and the process advances to a step S22 if the decision result in the step S21 becomes YES. The step S22 disconnects the connection between the data communication apparatus 7 and the central managing apparatus 6. A step S23 decides whether or not a predetermined time (for example, 1 minute) has elapsed, and the process advances to a step S24 if the decision result in the step S23 becomes YES. The step S24 calls the central managing apparatus 6 (called telephone number) based on the line type information and the called telephone number for the counter call which are included in the parameters stored in the parameter storage area of the non-volatile RAM 44, so as to make a test call (test communication).

The parameters (in this case, the line type information and the called telephone number) which are used when calling the central managing apparatus 6 are added to the test call data which are to be sent when the data communication apparatus 7 makes the test call. FIG. 14B shows a data format of the test call data which is returned from the data communication apparatus 7 to the central managing apparatus 6 in this case.

FIG. 14A shows a data format of the data which is to be sent from the central managing apparatus 6 to the data communication apparatus 7 when the central managing apparatus 6 makes the test call request. In the data shown in FIG. 14A, an information code "12330001211" which indicates the test call request is inserted into the field of the information code of the text data shown in FIG. 8, "01" which indicates the number of digits of the data as being 1 is inserted into the field of the data part digit number shown in FIG. 8, and a code ("3" in the case of the counter call) which indicates the call type information is inserted into the field of the data part shown in FIG. 8.

The CPU 41 of the data communication apparatus 7 receives the test call request by the data having the data format shown in FIG. 14A in the step S21, and calls the central managing apparatus 6 to make the test call 1 minute thereafter by the steps S22 and S23 based on the line type information and the called telephone number for the counter call which are included in the parameters stored in the parameter storage area of the non-volatile RAM 44.

The test call data to be sent when the data communication apparatus 7 makes the test call is as shown in FIG. 14B. That is, the information code "12330001211" which indicates the test call request of the data received when the test call request is received is inserted into the field of the information code of the text data shown in FIG. 8, "01" which indicates the number of digits of the data as being 10 is inserted into the field of the data part digit number shown in FIG. 8, and a code which indicates the call type information, a code which indicates the line type information within the parameters stored in the parameter storage are of the non-volatile RAM 44 and the date-and-hour (month, date, hour and minutes, each in 2 digits) which indicates the date and hour when the parameters are set (received from the central managing apparatus 6) are respectively inserted into the field of the data part shown in FIG. 8.

In this embodiment, the line type information is "0" in the case of a push-button (PB) line, "1" in the case of a 10 pps dial-pulse (DP) line, and "3" in the case of a 20 pps dial-pulse (DP) line.

In the description given above, the date-and-hour information at the time when the CPU within the main body 103 of the central managing apparatus 6 sends and resets the changed parameters to the data communication apparatus 7 is used as the parameter log information identifier which enables discrimination of the log of parameter changes made by the central managing apparatus 6. However, it is possible to add "A" to the parameters which are first sent to the data communication apparatus 7, add "B" to the parameters which are next sent to the data communication apparatus 7, and so on, instead of using the date-and-hour information. In other words, it is possible to use codes and symbols, such as alphabets, which are added to the parameters which are set to the data communication apparatus 7, as the parameter log information identifiers which enable the discrimination of the log of parameter changes made by the central managing apparatus 6.

The CPU within the main body 103 of the central managing apparatus 6 relates the changed parameters and the parameter log information identifiers which enable the discrimination of the log of parameter changes made, as shown in FIG. 12, and stores the related changed parameters and parameter log information identifiers into the database (DB) in the hard disk of the HDD 105. Accordingly, when the central managing apparatus 6 receives the test call data (that is, receives the test call) from the data communication apparatus 7, the central managing apparatus 6 can recognize the parameters at the point in time based on which the test call is generated (recognize the parameters at which point in time are correct) by referring to the parameter log information identifiers included in the test call data.

Returning now to the description of the test communication control process shown in FIG. 13, after the CPU 41 of the data communication apparatus 7 makes the test call in the step S24, a step S25 decides whether or not the communication with the central managing apparatus 6 by the test call was successful. The test communication control process ends if the decision result in the step S25 is YES. On the other hand, if the decision result in the step S25 is NO, a step S26 decides whether or not a number of re-calls made (number of re-dialings made) has reached a predetermined value. If the decision result in the step S26 is NO, the process returns to the step S24 after waiting for a re-dialing wait time, so as to make a test call by calling the central managing apparatus 6 (called telephone number). If the communication with the central managing apparatus 6 by the test call is unsuccessful and the number of re-calls made reaches the predetermined value, the decision result in the step S26 becomes YES, and the test communication control process ends.

FIG. 15 shows the communication procedure for a case where the communication with the central managing apparatus 6 by the test call using the parameters set in the data communication apparatus 7 is successful. In FIG. 15, a step S31 sets the parameters with respect to the data communication apparatus 7, and a step S32 makes a test call request with respect to the data communication apparatus 7. A step S33 makes a successful test call with respect to the central managing apparatus 6.

FIG. 16 shows the communication procedure for a case where the communication with the central managing apparatus 6 by the test call using the parameters set in the data communication apparatus 7 is unsuccessful, the test call is made again by resetting the parameters, and the communication with the central managing apparatus 6 by the test call is successful (ends normally) after the parameters are set for the third time. In FIG. 16, a step S41 sets the parameters with respect to the data communication apparatus 7, and a step S42 makes a test call request with respect to the data communication apparatus 7. A step S43 is unsuccessful in making a test call with respect to the central managing apparatus 6, and a step S44 makes a test call again with respect to the central managing apparatus 6 but this test call is also unsuccessful. A step S45 resets the parameters with respect to the data communication apparatus 7. A step S46 is unsuccessful in making a test call with respect to the central managing apparatus 6, and a step S47 makes a test call again with respect to the central managing apparatus 6 but this test call is also unsuccessful. A step S48 resets the parameters with respect to the data communication apparatus 7, and a step S49 makes a successful test call with respect to the central managing apparatus 6.

Therefore, the data communication apparatus 7 response to the test call request from the central managing apparatus 6, and calls the called telephone number within the parameters which are set by the central managing apparatus 6, so as to make the test call (test communication). Hence, in a case where the central managing apparatus 6 sets (or resets) the parameters by sending the parameters to the data communication apparatus 7 or, the central managing apparatus 6 can make access to the data communication apparatus 7 but cannot receive the status information which should be received periodically from the data communication apparatus 7, the central managing apparatus 6 makes a text call request, and judges whether or not the communication from the data communication apparatus 7 is made in a normal manner depending on whether or not a test call is received from the data communication apparatus 7. Accordingly, it is unnecessary to send a service person to the location where the data communication apparatus 7 is set up, and to realize an efficient system operation by reducing the personnel expenses.

In addition, by setting (storing) the called telephone number which is used when calling for each type of status information which is to be sent, the data communication apparatus 7 can make the test call by calling the called telephone number corresponding to the type of status information which is to be sent and is included in the parameters which are set from the central managing apparatus 6. For this reason, it is possible to judge whether or not the communication from the data communication apparatus 7 is made in a normal manner, for each called telephone number. As a result, it is unnecessary to send a service person to the location where the data communication apparatus 7 is set up, and to positively realize an efficient system operation by reducing the personnel expenses.

Moreover, by adding the line type information and the called telephone number (may be other parameters or added with other parameters) within the parameters which are set, to the test call data which are to be sent when making the test call from the data communication apparatus 7, the central managing apparatus 6 can recognize which parameters which were sent and reset to the data communication apparatus 7 at which point in time realized the normal communication. For this reason, the parameters can be reset without having to wait for the re-call time-out when the data communication apparatus 7 makes the test call, thereby enabling a more efficient system operation.

In a case where the central managing apparatus 6 makes the test call request with respect to the data communication apparatus 7 but cannot receive the test call data from the data communication apparatus 7, the central managing apparatus 6 may change the contents (line type information, called telephone number and the like) of the parameters and reset the changed parameters to the data communication apparatus 7 before making the test call request again. However, when such an operation is continued and the test call data is received from the data communication apparatus 7, it may become unclear which reset parameters sent to the data communication apparatus 7 at which-point in time actually enabled the normal communication. Hence, when the test call request is made, it is desirable that the changed parameters are reset to the data communication apparatus 7 by taking into consideration a time margin corresponding to the re-call time-out of the test call, before making the test call request again.

Further, a parameter log information identifier (for example, present date-and-hour information) which enables discrimination of a log of parameter changes may be added to the parameters which are to be sent from the central managing apparatus 6 to the data communication apparatus 7. In this case, when the data communication apparatus 7 responds to the test call request from the central managing apparatus 6, calls the called telephone number within the parameters which are set and makes the test call, the parameter log information identifier within the set parameters may be added to the test call data when making the test call. Accordingly, the central managing apparatus 6 can recognize which parameters which were sent and reset to the data communication apparatus 7 at which point in time realized the normal communication. For this reason, the parameters can be reset without having to wait for the re-call time-out when the data communication apparatus 7 makes the test call, thereby enabling a more efficient system operation.

In addition, the central managing apparatus 6 may relate and store the parameters which are to be sent to the data communication apparatus 7 and the parameter log information identifiers added to the parameters. In this case, the central managing apparatus 6 can recognize which parameters which were sent and reset to the data communication apparatus 7 at which point in time realized the normal communication. For this reason, the parameters can be reset without having to wait for the re-call time-out when the data communication apparatus 7 makes the test call, thereby enabling a more efficient system operation.

Next, a description will be given of a second embodiment of the remote managing system according to the present invention, by referring to FIG. 17. FIG. 17 is a system block diagram showing a structure of this second embodiment of the remote managing system. In FIG. 17, those parts which are the same as those corresponding parts in FIG. 1 are designated by the same reference numerals, and a description thereof will be omitted. This second embodiment of the remote managing system employs a second embodiment of the data communication apparatus according to the present invention, a second embodiment of the central managing apparatus according to the present invention, a second embodiment of the testing method according to the present invention, and a second embodiment of the computer-readable storage medium according to the present invention.

In the remote managing system shown in FIG. 17, the central managing apparatus 6 is connected to the communication line 8 via the Internet 62 and an Internet provider 61. In this embodiment, the central managing apparatus 6 is accessible by an Internet address. Hence, the parameters which are set to the data communication apparatus 7 from the central managing apparatus 6 include the Internet address of the central managing apparatus 6, in addition to the called telephone number. In this case, the called telephone number is the telephone number of the Internet provider 61. The operation of the remote managing system shown in FIG. 17 is basically the same as that of the first embodiment shown in FIG. 1, except that the communication between the central managing apparatus 6 and the data communication apparatus 7 is made via the Internet 62.

The present invention may be realized by one or more computer programs which are executed by the CPU 41 within the data communication apparatus 7 and/or the CPU within the main body 103 of the central managing apparatus 6. The computer program itself may be stored in a storage means (or section) such as the ROM 42, the RAM 43 and the non-volatile RAM 44 within the data communication apparatus 7, and a storage means (or section) such as the memory within the main body 103 of the central managing apparatus 6. The computer program may be downloaded into the storage means via the communication line 8 and/or the Internet 62. The computer-readable storage medium according to the present invention is formed by such a storage means which stores such a computer program. The storage means which stores computer program may be realized by various recording media, portable or otherwise, such as semiconductor memory devices and recording media such as magnetic recording media, optical recording media and magneto-optical recording media.

The managed apparatus to which the present invention is applied in the above described embodiments, include electronic apparatuses which have a communicating function and are connectable to a network or a communication line, such image processing apparatuses, electrical home appliances, automatic vending machines, medical equipments, power supply apparatuses, air conditioning systems, measuring systems, and computers. The image processing apparatuses include printers, facsimile machines, copying machines, scanners, and digital composite machines having composite functions. In addition, the measuring systems include systems for measuring supply of gas, electricity, water and the like.

Moreover, the status information of the managed apparatus may be any kind of information related to the state of the managed apparatus, and is not limited to a specific kind of information.

Further, the present invention is not limited to these embodiments, but various variations and modifications may be made without departing from the scope of the present invention.

What is claimed is:

1. A remote managing system comprising:
   a data communication apparatus configured to acquire status information from a managed apparatus which is to be remotely managed, and to manage the status information therein; and
   a central managing apparatus configured to communicate with the data communication apparatus via a communication line;
   said central managing apparatus comprising:
      a parameter sending section configured to send a plurality of sets of parameters, which are related to an access from the data communication apparatus to the central managing apparatus, to the data communication apparatus;
      an identification information adding section configured to add identification information to each of the plurality of sets of parameters which are to be sent by the parameter sending section, the identification information identifying the sets of parameters that successfully connect to the central managing apparatus from the data communication apparatus and enabling discrimination of a log of parameter changes made over time;
      a test communication request section configured to send a test communication request to the data communication apparatus;
      a storage section configured to store on a storage unit of the central managing apparatus, when a test communication is received from the data communication apparatus, a set of parameters used in the test communication and the identification information corresponding to the set of parameters used in the test communication as a log of parameter changes made over time; and
      a resetting section configured to reset, when the test communication is received from the data communication apparatus, the parameters at the data communication apparatus related to the identification information stored in the storage unit based on the identification information received in the test communication,
   said data communication apparatus comprising:
      a parameter set section configured to set the plurality of sets of parameters which are added with the identification information and are sent from the parameter sending section of the central managing apparatus;
      a test communication section configured to make a test communication with the central managing apparatus in response to the test communication request, the test communication being based on the plurality of sets of parameters set by the parameter set section and including the identification information added with the parameters sent from the parameter sending section;
      a judging section configured to judge which sets of parameters successfully connect to the central managing apparatus by checking the storage unit; and
      a setting section configured to set, with respect to the data communication apparatus, each set of parameters that successfully connects to the central managing apparatus.

2. The remote managing system as claimed in claim 1, wherein said test communication section comprises:
   means for establishing a connection with the central managing apparatus;
   means for disconnecting the connection in response to a request from the central managing apparatus; and
   means for making the test communication after disconnection of the connection.

3. The remote managing system as claimed in claim 1, wherein said parameter set section is set with the called telephone number for each type of status information to be sent to the central managing apparatus.

4. The remote managing system as claimed in claim 1, wherein said test communication section adds each of the plurality of sets of parameters to text data which are to be sent to the central managing apparatus during the test communication.

5. The remote managing system as claimed in claim 1, which is coupled to the central managing apparatus via the communication line and Internet, wherein:
the plurality of sets of parameters include an Internet address of the central managing apparatus; and
said test communication section makes the test communication with respect to the Internet address.

6. The remote managing system as claimed in claim 1, wherein said identification information adding section adds to the plurality of sets of parameters, as the identification information, date-and-hour information which indicates a date and hour when the parameters are to be sent by said parameter sending section.

7. The remote managing system as claimed in claim 1, further comprising:
a section configured to relate and store the plurality of sets of parameters sent from said parameter sending section and the identification information which is added to the parameters by said identification information adding section.

8. The remote managing system as claimed in claim 1, wherein the plurality of sets of parameters include one of line type information indicating a type of telephone line to which the data communication apparatus is connected, and an external line selection signal added before a called telephone number which is used when calling the central managing apparatus from the data communication apparatus.

9. A testing method for testing a data communication apparatus which sends to a central managing apparatus via a communication line status information of at least one managed apparatus which is to be remotely managed by the central managing apparatus, comprising:
establishing a connection between the data communication apparatus and the central managing apparatus to enable a communication therebetween;
accessing the data communication apparatus from the central managing apparatus;
waiting a predetermined amount of time for a counter call from the data communication apparatus;
subsequently, determining that the counter call has not been received within the predetermined amount of time;
in response to the determination that the counter call has not been received within the predetermined amount of time, sending a plurality of sets of parameters, which are set by said central managing apparatus and are related to an access from said central managing apparatus to said data communications apparatus and include added identification information that enables discrimination of a log of parameter changes, the parameters being sent after the counter call has not been received within the predetermined amount of time;
storing the plurality of sets of parameters sent by the central managing apparatus within a storage unit of the data communications apparatus;
disconnecting the connection between the data communication apparatus and the central managing apparatus in response to a test call request from the central managing apparatus;
making a test call by calling the central managing apparatus from the data communication apparatus based on line type information and a called telephone number of a counter call within the plurality of sets of parameters which are stored within the data communication apparatus the test call including the added identification information;
judging whether or not a communication from the data communication apparatus to the central managing apparatus made by the test call is successful;
storing, when the communication made by the test call is successful, the parameters used in the communication and the identification information corresponding to the parameters used in the test communication as a log of parameter changes made over time; and
setting, at the data communication apparatus, when the communication is received at the central managing apparatus, the set of parameters that successfully connect to the central managing apparatus.

10. The testing method as claimed in claim 9, wherein the plurality of sets of parameters include one of line type information indicating a type of telephone line to which the data communication apparatus is connected, and an external line selection signal added before the called telephone number which is used when calling the central managing apparatus from the data communication apparatus.

11. A remote managing system comprising:
a central managing apparatus;
at least one managed apparatus which is to be remotely managed by the central managing apparatus; and
a data communication apparatus configured to send status information from the managed apparatus to the central managing apparatus via a communication line,
said central managing apparatus comprising:
a parameter sending section configured to send a plurality of sets of parameters to the data communication apparatus, said plurality of sets of parameters being related to an access from the data communication apparatus to the central managing apparatus and including a called telephone number which is used when calling the central managing apparatus from the data communication apparatus and/or line type information which indicates a type of line to which the data communication apparatus is connected;
an identification information adding section configured to add identification information to each of the plurality of sets of parameters which are to be sent by said parameter sending section, the identification information identifying the sets of parameters that successfully connect to the central managing apparatus from the data communication apparatus and enabling discrimination of a log of parameter changes made over time;
a test communication request section configured to send a test communication request to the data communication apparatus;
a storage section configured to store, when a test communication is received from the data communication apparatus, a set of parameters used in the test communication and the identification information corresponding to the set of parameters used in the test communication as a log of parameter changes made over time; and
a resetting section configured to reset, when the test communication is received from the data communication apparatus, the parameters at the data communication apparatus related to the identification information stored in the storage unit based on the identification information received in the test communication,
said data communication apparatus comprising:
a parameter set section configured to set the plurality of sets of parameters received from the said central managing apparatus;

a test communication section configured to call the called telephone number and to make a test communication in response to the test communication request, the test communication being based on the plurality of sets of parameters set by the parameter set section and including the identification information added to the plurality of sets of parameters;

a judging section configured to judge which sets of parameters successfully connects to the central managing apparatus by checking the storage section; and a setting section configured to set, with respect to the data communication apparatus, each set of parameters that successfully connects to the central managing apparatus.

12. The remote managing system as claimed in claim 11, wherein the test communication section of said data communication apparatus comprises:

means for establishing a connection with the central managing apparatus;

means for disconnecting the connection in response to a request from the central managing apparatus; and means for making the test communication after disconnection of the connection.

13. The remote managing system as claimed in claim 11, wherein: the data communication apparatus is coupled to the central managing apparatus via the communication line and Internet; the plurality of sets of parameters include an Internet address of the central managing apparatus; and the test communication section of said data communication apparatus calls the called telephone number, and makes the test communication with respect to the Internet address.

14. The remote managing system as claimed in claim 11, wherein the plurality of sets of parameters include an external line selection signal added before the called telephone number which is used when calling the central managing apparatus from the data communication apparatus.

15. One or more non-transitory computer-readable storage mediums storing one or more programs for a testing procedure which tests a data communication apparatus which sends status information of at least one managed apparatus which is to be remotely managed by the central managing apparatus to the central managing apparatus via a communication line, said one or more programs, comprising:

a parameter sending procedure causing the central managing apparatus to send a plurality of sets of parameters, which are related to an access from the data communication apparatus to the central managing apparatus, to the data communication apparatus, said parameters including a called telephone number which is called when the central managing apparatus is called from the data communication apparatus and/or line type information indicating a type of line to which the data communication apparatus is connected;

an identification information adding procedure causing the central managing apparatus to add identification information to each of the plurality of sets of parameters which are to be sent by said parameter sending procedure, the identification information identifying the sets of parameters that successfully connect to the central managing apparatus from the data communication apparatus and enabling discrimination of a log of parameter changes made over time; and a test communication request procedure causing the central managing apparatus to send a test communication request to the data communication apparatus;

a storage procedure causing the central managing apparatus to store in a storage unit, when a test communication is received from the data communication apparatus, a set of parameters used in the test communication and the identification information corresponding to the set of parameters used in the test communication as a log of parameter changes made over time;

a resetting procedure causing the central managing apparatus to reset, when the test communication is received from the data communication apparatus, the parameters at the data communication apparatus related to the identification information stored in the storage unit based on the identification information received in the test communication;

a parameter set procedure causing the data communication apparatus to be set with the plurality of sets of parameters which are added with the identification information and are sent from the central managing apparatus;

a test communication procedure causing the data communication apparatus to call the called telephone number and making a test communication in response to the test communication request from the central managing apparatus, the test communication being based on the plurality of sets of parameters set by the parameter set section and including the identification information;

a judging procedure causing the data communication apparatus to judge which sets of parameters successfully connect to the central managing apparatus by checking the storage unit; and a setting procedure causing the data communication apparatus to set each set of parameters that successfully connects to the central managing apparatus.

16. The one or more non-transitory computer-readable storage mediums as claimed in claim 15, wherein the test communication procedure comprises:

a procedure causing the data communication apparatus to establish a connection with the central managing apparatus;

a procedure causing the data communication apparatus to disconnect the connection in response to a request from the central managing apparatus; and a procedure causing the data communication apparatus to make the test communication after disconnection of the connection.

17. The one or more non-transitory computer-readable storage mediums as claimed in claim 15, wherein the plurality of sets of parameters include an external line selection signal added before the called telephone number which is used when calling the central managing apparatus from the data communication apparatus.

18. One or more non-transitory computer-readable storage mediums which stores one or more programs of procedures for testing a data communication apparatus which sends to a central managing apparatus via a communication line status information of at least one managed apparatus which is to be remotely managed by the central managing apparatus, said one or more programs comprising:

a procedure causing the data communication apparatus to make a connection to the central managing apparatus to enable a communication therewith;

a procedure causing the central managing apparatus to send a plurality of sets of parameters, which are related to an access from the data communication apparatus to the central managing apparatus, to the data communication apparatus, said parameters including a called telephone number which is called when the central managing apparatus is called from the data communication apparatus and/or line type information indicating a type of line to which the data communication apparatus is connected;

a procedure causing the central managing apparatus to add identification information to each of the plurality of sets of parameters which are to be sent to the data communication apparatus, the identification information identifying the sets of parameters that successfully connect to the central managing apparatus from the data communication apparatus and enabling discrimination of a log of parameter changes made over time;

a test call request procedure causing the central managing apparatus to send a test call request to the data communication apparatus;

a storage procedure causing the central managing apparatus to store in a storage unit, when a test call is received from the data communication apparatus, a set of parameters used in the test call and the identification information corresponding to the set of parameters used in the test call as a log of parameter changes made over time;

a resetting procedure causing the central managing apparatus to reset, when the test call is received from the data communication apparatus, the parameters at the data communication apparatus related to the identification information stored in the storage unit based on the identification information received in the test call;

a parameter set procedure causing the central managing apparatus to store the plurality of sets of parameters and the identification information corresponding to the plurality of sets of parameters;

a procedure causing the data communication apparatus to disconnect the connection to the central managing apparatus in response to the test call request from the central managing apparatus;

a procedure causing the data communication apparatus to make a test call by calling the central managing apparatus based on line type information and a called telephone number of a counter call within the parameters which are stored within the computer;

a procedure causing the data communication apparatus to judge whether or not a communication to the central managing apparatus made by the test call is successful; and a setting procedure causing the data communication apparatus to set each set of parameters that successfully connects to the central managing apparatus.

19. The one or more non-transitory computer-readable storage mediums as claimed in claim 18, wherein the plurality of sets of parameters include an external line selection signal added before the called telephone number which is used when calling the central managing apparatus from the data communication apparatus.

* * * * *